US012576469B2

(12) United States Patent
Suzuki

(10) Patent No.: US 12,576,469 B2
(45) Date of Patent: Mar. 17, 2026

(54) TECHNIQUE FOR CONTROLLING MOTOR IN HANDHELD ELECTRIC WORK MACHINE

(71) Applicant: MAKITA CORPORATION, Anjo (JP)

(72) Inventor: Hitoshi Suzuki, Anjo (JP)

(73) Assignee: Makita Corporation, Anjo (JP)

( * ) Notice: Subject to any disclaimer, the term of this patent is extended or adjusted under 35 U.S.C. 154(b) by 560 days.

(21) Appl. No.: 17/990,884

(22) Filed: Nov. 21, 2022

(65) Prior Publication Data

US 2023/0166379 A1    Jun. 1, 2023

(30) Foreign Application Priority Data

Dec. 1, 2021    (JP) ................................. 2021-195558

(51) Int. Cl.
*H02K 11/33*          (2016.01)
*B24B 23/02*          (2006.01)
*H02K 7/14*           (2006.01)

(52) U.S. Cl.
CPC ............. *B24B 23/02* (2013.01); *H02K 7/145* (2013.01); *H02K 11/33* (2016.01)

(58) Field of Classification Search
CPC ............................... H02K 11/33; H02K 7/145
USPC ......................................................... 310/50
See application file for complete search history.

(56) References Cited

U.S. PATENT DOCUMENTS

| | | | | |
|---|---|---|---|---|
| 9,321,155 | B2 * | 4/2016 | Eshleman | ............... E21B 15/04 |
| 9,590,475 | B2 * | 3/2017 | Oomori | ................... B25F 5/008 |
| 10,486,280 | B2 * | 11/2019 | Yamamoto | ............. B25D 16/00 |
| 10,562,168 | B2 * | 2/2020 | Lutz | ....................... B24B 23/028 |
| 10,589,412 | B2 * | 3/2020 | Nagasaka | ................. B25F 5/02 |
| 10,857,645 | B2 * | 12/2020 | Schadow | .............. B24B 55/052 |
| 10,890,229 | B2 * | 1/2021 | Zhang | ................... B24B 23/028 |
| 10,953,532 | B2 * | 3/2021 | Sunabe | ................ B25D 11/005 |
| 11,020,846 | B2 * | 6/2021 | Kawano | ................. B25D 16/00 |
| 2014/0231113 | A1 * | 8/2014 | Steurer | .................... B25F 5/00 173/1 |
| 2018/0099391 | A1 * | 4/2018 | Umemoto | ................. B25F 5/00 |
| 2018/0193996 | A1 * | 7/2018 | Hirano | ..................... B25G 1/06 |
| 2018/0272494 | A1 * | 9/2018 | Schadow | ............... B25F 5/026 |
| 2020/0149609 | A1 * | 5/2020 | Zhang | .................... B25F 5/025 |
| 2020/0306907 | A1 * | 10/2020 | Iida | ................... B23Q 11/0071 |
| 2021/0252652 | A1 * | 8/2021 | Mueckl | ................. B23Q 5/043 |

FOREIGN PATENT DOCUMENTS

| | | | | |
|---|---|---|---|---|
| JP | 2020192655 A | * | 12/2020 | ............... B25F 5/02 |
| JP | 2021142607 A | * | 9/2021 | |
| WO | 2017/051892 A1 | | 3/2017 | |
| WO | 2021/044799 A1 | | 3/2021 | |

* cited by examiner

*Primary Examiner* — Alex W Mok

(74) *Attorney, Agent, or Firm* — Oliff PLC

(57)          ABSTRACT

One aspect of the present disclosure provides an electric work machine including a motor, a motor driver, an output shaft, a housing, two or more measurement devices, and a control circuit. The housing includes a handle fixed thereto or is configured such that the handle is detachably attached thereto. The two or more measurement devices (i) receive two or more loads from the handle fixed or attached to the housing, and also (ii) measure the two or more loads received. The control circuit adjusts a magnitude of the electric power, based on the two or more loads measured.

22 Claims, 10 Drawing Sheets

CONNECTING
/GRIPPING DETERMINATION PROCESS

START

S110
ACQUIRE EACH LOAD

S120
AT LEAST ONE
OF MEASURED LOADS
≧ LT1 ?    NO

YES    S160
LIGHT FIRST LED

S130
LIGHT OFF FIRST LED

S170
AT LEAST ONE
OF MEASURED LOADS
≧ LT2 ?    NO

YES

S200
LOAD IS VARIED
IN PRESET PERIOD
OF TIME?    NO

YES

S180
LIGHT SECOND LED

S140
LIGHT OFF SECOND LED

S190
CLEAR
ELECTRIC POWER LIMIT FLAG

S150
SET
ELECTRIC POWER LIMIT FLAG

END

REAR

LEFT

RIGHT

FRONT

TECHNIQUE FOR CONTROLLING MOTOR IN HANDHELD ELECTRIC WORK MACHINE

CROSS-REFERENCE TO RELATED APPLICATIONS

This application claims the benefit of Japanese Patent Application No. 2021-195558 filed on Dec. 1, 2021 with the Japan Patent Office, the entire disclosure of which is incorporated herein by reference.

BACKGROUND

The present disclosure relates to a handheld electric work machine.

WO2017/051892 discloses a grinder with a side handle. The side handle is attached to a housing accommodating a motor.

If a user of the grinder does not grip the side handle and drives the motor, kickback may occur. The kickback refers to a phenomenon that a tool mounted on the grinder receives a reaction force from a work target and thereby the grinder is swung around. The grinder is configured to reduce occurrence the kickback. Specifically, the grinder is configured to drive the motor during the side handle being gripped by the user.

SUMMARY

Whether the side handle is gripped is detected by a detecting unit provided on the side handle. Detection signals from the detecting unit are input to a controller arranged within a housing. The controller controls a driving of the motor.

However, it is not easy for the grinder described above to provide a transmission path of the detection signals from the detecting unit to the controller, and thus a device configuration for providing the transmission path is made more complicated.

In one aspect of the present disclosure, it is desirable to detect a state of a handle with a simple configuration.

One aspect of the present disclosure provides an electric work machine including a motor, a motor driver, an output shaft, a housing, two or more measurement devices, and a control circuit.

The motor generates a rotational force. The motor driver supplies an electric power to the motor, thereby to drive the motor. The output shaft transmits the rotational force of the motor to a tool, thereby to drive the tool.

The housing (i) includes a handle (or a side handle) fixed thereto or (ii) is configured such that the handle is detachably attached thereto. The handle is gripped by a user of the handheld electric work machine.

Two or more measurement devices (i) receive two or more loads from the handle fixed or attached to the housing, and also (ii) measure the two or more loads received.

The control circuit adjusts a magnitude of the electric power, based on the two or more loads measured.

The control circuit may determine whether the handle is gripped, based on the two or more loads measured.

When the handle is fixed or attached to the housing, the handle abuts the housing. In this case, the two or more measurement devices receive substantially equal loads to each other.

However, when the user grips the handle and brings up the electric work machine, a holding force applied to the handle or a self-weight of the electric work machine makes the two or more loads unbalanced. That is, the two or more loads may be unequal to each other. Thus, the control circuit enables a detection (or confirmation, or grasping) of a state of the handle, based on the two or more loads.

The electric work machine eliminates the need for providing (i) the measurement device on the handle, and (ii) a signal path from the measurement device to the control circuit disposed within the housing. Thus, a configuration of the electric work machine can be simplified.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. Overview of Embodiments

Figure 1:
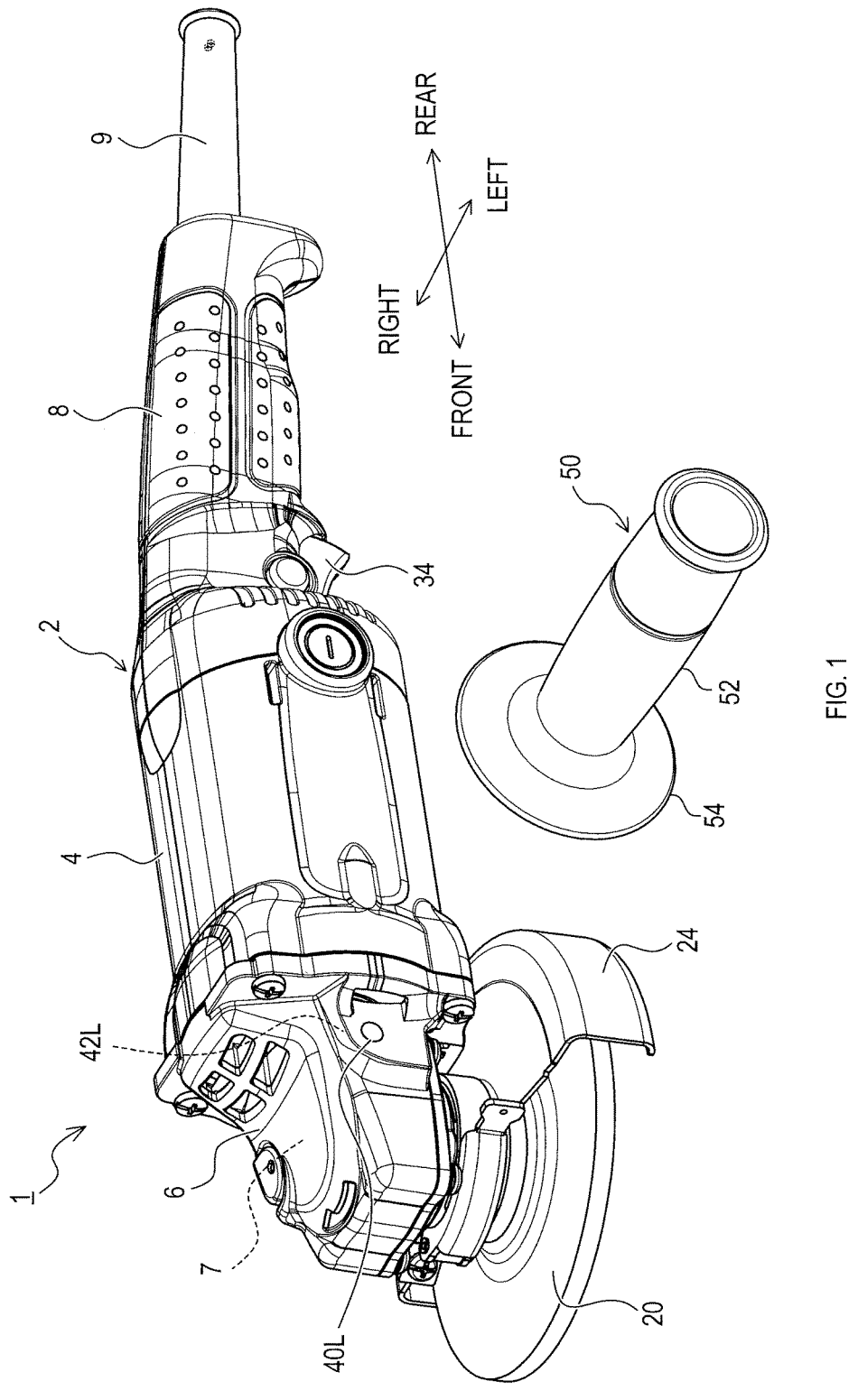
FIG. 1 is a perspective view of an electric work machine in an embodiment.

One embodiment may provide a handheld electric work machine (hereinafter, an "electric work machine") including at least any one of the following Features 1 through 7.

Feature 1: a motor configured to generate a rotational force.

Feature 2: a motor driver configured to supply an electric power to the motor, thereby to drive the motor.

Feature 3: an output shaft (or a drive mechanism, or two or more gears) configured to transmit the rotational force of the motor to a tool, thereby to drive the tool.

Feature 4: a handle (or a side handle) configured to be gripped by a user of the handheld electric work machine.

Feature 5: a housing (i) including a handle fixed (or secured) thereto or (ii) being configured such that the handle is detachably attached thereto.

Feature 6: two or more measurement devices (or measurement equipment, or load sensors, or load detection devices) configured (i) to receive two or more loads from the handle fixed or attached to the housing, and also (ii) to measure the two or more loads received.

Feature 7: a control circuit configured to adjust (or vary, or control) a magnitude of the electric power, based on the two or more loads measured.

The handle may be fixed or attached to any portions of the housing. The handle may be fixed or attached to the housing in any attaching manner. The handle may be in any form, for example, a side handle. That is, the handle may be fixed to or detachably attached to a side surface of the housing. The handle may be undetachable from the housing.

The housing may be configured to be gripped by the user. That is, user may use the electric work machine with gripping the handle in one hand and with the housing in the other hand.

The control circuit may determine whether the handle is attached to the housing and/or whether the handle is gripped by the user, based on the two or more loads measured.

The electric work machine including at least one of the Features 1 through 7 can detect the state of the handle with a simple configuration in the housing. Further, the magnitude of the electric power can be adjusted in accordance with the state of the handle.

One embodiment may include the following Feature 8 in addition to or in place of at least one of the aforementioned Features 1 through 7.

Feature 8: the control circuit is configured (i) to adjust (or set, or control) the magnitude of the electric power to a first magnitude, and also (ii) to adjust (or set, or control, or limit) the magnitude of the electric power to a second magnitude based on the two or more loads measured satisfying a preset requirement. The second magnitude is smaller than the first magnitude.

Each of the first and second magnitude is greater than zero. The second magnitude may be zero. The electric work machine including at least Feature 1 to 8 adjusts the magnitude of the electric power to the second magnitude, based on the two or more loads measured. Thus, occurrence of kickback is reduced.

One embodiment may include at least one of the following Features 9 through 11 in addition to or in place of at least one of the aforementioned Features 1 through 8.

Feature 9: the handle includes a shaft (i) fixed into the housing or (ii) configured to be detachably inserted into the housing, and a holding portion (or a grip) configured to be gripped by the user the handle.

Feature 10: the holding portion accommodates a portion of the shaft.

Feature 11: the housing includes a first hole. The first hole (i) has the shaft fixed therein or (ii) is configured to detachably receive the shaft.

The shaft may be undetachable from the first hole.

One embodiment may include the following Feature 12 and/or Feature 13 in addition to or in place of at least one of the aforementioned Features 1 through 11.

Feature 12: each of the two or more measurement devices includes a pressure sensor, the pressure sensor being configured to receive a corresponding one of the two or more loads.

Feature 13: the pressure sensor has a variable resistance value, and the variable resistance value varies in accordance with a corresponding one of the two or more loads received.

The electric work machine including at least Features 1 through 7, 12, and 13 can readily measure the two or more loads.

One embodiment may include at least one of the following Features 14 through 16 in addition to or in place of at least one of the aforementioned Features 1 through 13.

Feature 14: the first hole includes an opening.

Feature 15: the two or more measurement devices are arranged along a periphery of the opening of the first hole.

Feature 16: the two or more measurement devices include a first measurement device and a second measurement device. A first distance between the first measurement device and a center of the opening is equal to a second distance between the second measurement device and the center of the opening.

One embodiment may include the following Feature 17 in addition to or in place of at least one of the aforementioned Features 1 through 16.

Feature 17: each of the two or more measurement devices includes: a first surface configured to face the handle fixed or attached to the housing; and a first elastic body on the first surface.

One embodiment may include the following Feature 18 and/or Feature 19 in addition to or in place of at least one of the aforementioned Features 1 through 17.

Feature 18: the first elastic body is configured to be pressed by the handle fixed or attached to the housing.

Feature 19: the first surface is configured to receive a corresponding one of the two or more loads via the first elastic body.

The electric work machine including at least Features 1 through 7, and 17 through 19 can adjust the two or more loads from the handle (specifically, for example, the holding portion) with a corresponding one of the first elastic body. This achieves a protection of the two or more measurement devices from excessive loads, and also an adjustment of measurement sensitivity (or detection sensitivity) of the two or more measurement devices.

One embodiment may include the following Feature 20 in addition to or in place of at least one of the aforementioned Features 1 through 19.

Feature 20: the handle includes a second surface. The second surface (i) has an annular shape and (ii) includes the shaft at a center of the annular shape. The second surface (i) is perpendicular to the shaft, and (ii) configured to face the two or more measurement devices while the handle is fixed or attached to the housing.

The electric work machine including at least the Features 1 through 7, 9, and 20 enables a reduction in variability of the two or more loads caused by changes in a positional relationship (for example, a distance) between the two or more measurement devices and the handle.

One embodiment may include the following Feature 21 in addition to or in place of at least one of the aforementioned Features 1 through 20.

Feature 21: the handle includes a second elastic body between the shaft and the holding portion.

The electric work machine including at least the Features 1 through 7, 9, and 21 enables the second elastic body to absorb (or damp) vibrations transmitted from the housing to the handle. Accordingly, it is possible to reduce a transmission of the vibrations in the electric work machine to user's hand.

One embodiment may include the following Feature 22 and/or Feature 23 in addition to or in place of at least one of the aforementioned Features 1 through 21.

Feature 22: each of the two or more measurement devices includes: a first surface configured to face the handle fixed or attached to the housing, and a first elastic body on the first surface, the first elastic body having a first stiffness (or a first spring constant).

Feature 23: the second elastic body has a second stiffness (or a second spring constant). The second stiffness is greater than the first stiffness.

The electric work machine including at least the Features 1 through 7, 9, and 21 through 23 enables a reduction in variability of the two or more loads caused by vibrations in the electric work machine. Accordingly, the two or more loads can be more accurately measured, and this enables the magnitude of the electric power to be suitably controlled.

One embodiment may include the following Feature 24 in addition to or in place of at least one of the aforementioned Features 1 through 23.

Feature 24: the control circuit is configured to adjust the magnitude of the electric power to a first magnitude, and adjust the magnitude of the electric power to a second magnitude based on none of the two or more loads measured reaching a first threshold. The second magnitude is smaller than the first magnitude.

The electric work machine including at least the Features 1 through 7, and 24, if the handle is not attached to the housing, enables a reduction in kickback by limiting the electric power to the motor.

If at least one of the two or more loads measured is greater than or equal to the first threshold, the control circuit may adjust the magnitude of the electric power to the first magnitude. If at least one of the two or more loads measured is greater than or equal to the first threshold, the control circuit may determine that the handle is fixed or attached to the housing. When the control circuit determines that the handle is fixed or attached to the housing the control circuit may determine whether the handle is gripped by the user.

The control circuit may determine that the handle is not attached to the housing, based on none of the two or more loads measured by the two or more measurement devices has reached the first threshold.

One embodiment may include the following Feature 25 in addition to or in place of at least one of the aforementioned Features 1 through 24.

Feature 25: the control circuit is configured to adjust the magnitude of the electric power to a second magnitude, based on (i) at least one of the two or more loads measured being greater than or equal to the first threshold, and also (ii) none of the two or more loads measured reaching a second threshold. The second threshold is greater than the first threshold.

One embodiment may include the following Feature 26 in addition to or in place of at least one of the aforementioned Features 1 through 25.

Feature 26: the control circuit is configured to adjust the magnitude of the electric power to the first magnitude, based on at least one of the two or more loads measured being greater than or equal to the second threshold.

When the handle is not gripped by the user, the two or more loads are substantially equal to each other (for example, an initial load). Conversely, when the handle is gripped by the user, the two or more loads become unbalanced. Specifically, for example, at least one of the two or more loads become greater than the initial load.

Accordingly, if at least one of the two or more loads is greater than or equal to the second threshold, the control circuit may determine that the handle is gripped by the user. If none of the two or more loads reaches the second threshold, the control circuit may determine that the handle is not gripped by the use.

One embodiment may include the following Feature 27 and/or Feature 28 in addition to or in place of at least one of the aforementioned Features 1 through 26.

Feature 27: the control circuit is configured to adjust the magnitude of the electric power to the first magnitude, based on at least one of the two or more loads measured having varied within a preset period of time.

Feature 28: the control circuit is configured to adjust the magnitude of the electric power to the first magnitude, based on (i) none of the two or more loads measured reaching the second threshold, and also (ii) at least one of the two or more loads measured having varied within the preset period of time.

Even if the handle is gripped by the user, the user's holding force is so small that none of the two or more loads may reach the second threshold. However, during the user gripping the handle and bringing up the electric work machine, the two or more loads may vary.

Accordingly, if at least one of the two or more loads measured varies within the preset period of time, the control circuit may determine that the handle is gripped by the user. Such electric work machine can more successfully detect that the handle is gripped by the user.

One embodiment may include the following Feature 29 and/or Feature 30 in addition to or in place of at least one of the aforementioned Features 1 through 28.

Feature 29: the control circuit is configured to receive a drive command to thereby drive the motor. The drive command directs the control circuit to drive the motor.

Feature 30: the control circuit is configured to adjust the magnitude of the electric power to the second magnitude, based on (i) the motor having stopped, (ii) the control circuit receiving the drive command, and also (iii) a first load of the two or more loads measured being greater than or equal to a third threshold. The third threshold is greater than the second threshold. In other words, the control circuit is configured to adjust the magnitude of the electric power to the second magnitude, based on the third threshold being the first load or more at a start time of driving the motor (that is, immediately before the motor is driven).

If any of the two or more loads measured is greater than or equal to the third threshold, the control circuit may determine that the tool is pressed against an external work target (or work piece).

The electric work machine including at least the Features 1 through 7, 24, 25, 29, and 30 enables a reduction in occurrence of kickback immediately after the start time of driving the motor.

One embodiment may include the following Feature 31 in addition to or in place of at least one of the aforementioned Features 1 through 30.

Feature 31: the control circuit is configured to adjust the magnitude of the electric power to the first magnitude, based on the first load having fallen below the third threshold. In other words, the control circuit is configured to cancel a limitation to the second magnitude, based on the first load having fallen below the third threshold.

In the electric work machine including at least the Features 1 through 7, 24, 25, 29 through 31, even if the tool is pressed against the work target and hence the electric power is limited, the user can relax such a pressing state, thereby to cancel the limitation of the electric power. Accordingly, a rotation speed of the motor can be increased from a rotation speed before the limitation. As a result, even if the electric power is limited at the start time of driving the motor, it is possible for the user to return the motor to a normal rotational state during an operation, thereby to perform a desired work.

One embodiment may include the following Feature 32 and/or Feature 33 in addition to or in place of at least one of the aforementioned Features 1 through 31.

Feature 32: the handheld electric work machine includes a first electric system configured to conduct an AC power.

Feature 33: the handheld electric work machine includes a second electric system electrically isolated from the first electric system.

If one embodiment includes the aforementioned Feature 32, the embodiment may further include the following Feature 34. Further/alternatively, if one embodiment includes the aforementioned Feature 33, the embodiment may further include the following Feature 35.

Feature 34: the electric power to be supplied to the motor is the AC power, and also the first electric system includes the motor and the motor driver.

Feature 35: the second electric system includes the two or more measurement devices and the control circuit.

One embodiment may include at least one of the following Features 36 through 38 in addition to or in place of at least one of the aforementioned Features 1 through 35.

Feature 36: the electric work machine further includes a coupler configured to optically or electromagnetically couple the first electric system to the second electric system.

Feature 37: the coupler is configured to optically or electromagnetically transmit a signal from the first electric system to the second electric system, and/or from the second electric system to the first electric system.

Feature 38: the two or more measurement devices includes first through third measurement devices.

One embodiment may provide a method of controlling the motor in the electric work machine including at least any one of the following Features 39 and 40.

Feature 39: measuring two or more loads received from a handle of the handheld electric work machine.

Feature 40: varying (or adjusting, or controlling) a magnitude of the electric power supplied to the motor, based on the two or more loads measured.

The method including the Features 39 and 40 can adjust the magnitude of the electric power in accordance with the state of the handle.

In one embodiment, the aforementioned Features 1 through 40 may be combined in any way. In one embodiment, any of the aforementioned Features 1 through 40 may be omitted.

2. Specific Example Embodiment

Hereinafter, a specific example embodiment is described. The specific example embodiment is merely one example, and the present disclosure is not limited by the embodiment, and may be implemented in any forms.

2-1. Structure of Electric Work Machine

As shown in FIG. 1, the present embodiment provides a handheld electric work machine (hereinafter, "electric work machine") 1. The electric work machine 1 in the present embodiment is in a form of a handheld electric grinder. The electric work machine 1 includes a main body (or housing) 2. The main body 2 includes a motor housing 4, a gear housing 6, and a rear housing 8. The electric work machine 1 includes a power cord 9. The main body 2 is configured such that a handle 50 is detachably attached thereto.

The motor housing 4 has a substantially cylindrical shape. The motor housing 4 accommodates a motor 30 (see FIG. 5). The motor 30 includes a rotor (not shown). Rotation of the motor 30 specifically means that the rotor rotates. The motor 30 in the present embodiment is in a form of an AC motor.

The motor 30 is arranged in the motor housing 4 such that a rotation axis of the motor 30 (that is, a rotation axis of the rotor) is parallel or substantially parallel to a central axis of the motor housing 4. The central axis passes through the main body 2 (for example, the gravity center thereof or the vicinity of the gravity center), and extends in front-rear directions of the electric work machine 1. The motor 30 may be arranged such that the rotation axis coincides with or substantially coincides with the central axis. The rotor protrudes frontward (that is, toward the gear housing 6).

The rear housing 8 has a substantially cylindrical shape. The rear housing 8 is provided behind the motor housing 4. The rear housing 8 accommodates a driving device 10 (see FIG. 5). The driving device 10 receives an electric power from an external AC power source via the power cord 9. The driving device 10 supplies the received electric power to the motor 30, thereby to drive the motor 30.

The rear housing 8 is configured such that a user of the electric work machine 1 may grip the rear housing 8 in one hand. That is, the rear housing 8 works as a grip. A trigger 34 is provided on the rear housing 8 closer to the motor housing 4. The user can move (or pull, or manually operate) the trigger 34 in one hand, while gripping the rear housing 8 in the same hand.

The gear housing 6 is provided in front of the motor housing 4. The gear housing 6 accommodates a drive mechanism 7. The drive mechanism 7 includes two or more gears. The drive mechanism 7 (i) converts a rotational force of the motor 30 to a rotational force around a rotational axis of an output shaft (or the spindle) 22 (see FIG. 2A and FIG. 2B), and (ii) transmits the converted rotational force to the output shaft 22. The gear housing 6 accommodates the output shaft 22. The output shaft 22 is accommodated such that a central axis (that is, the rotational axis) of the output shaft 22 is perpendicular to the rotation axis of the motor 30. The drive mechanism 7 includes, for example, two bevel gears. The two bevel gears transmit the rotation of the motor 30 to the output shaft 22.

Figures 2A, 2B:
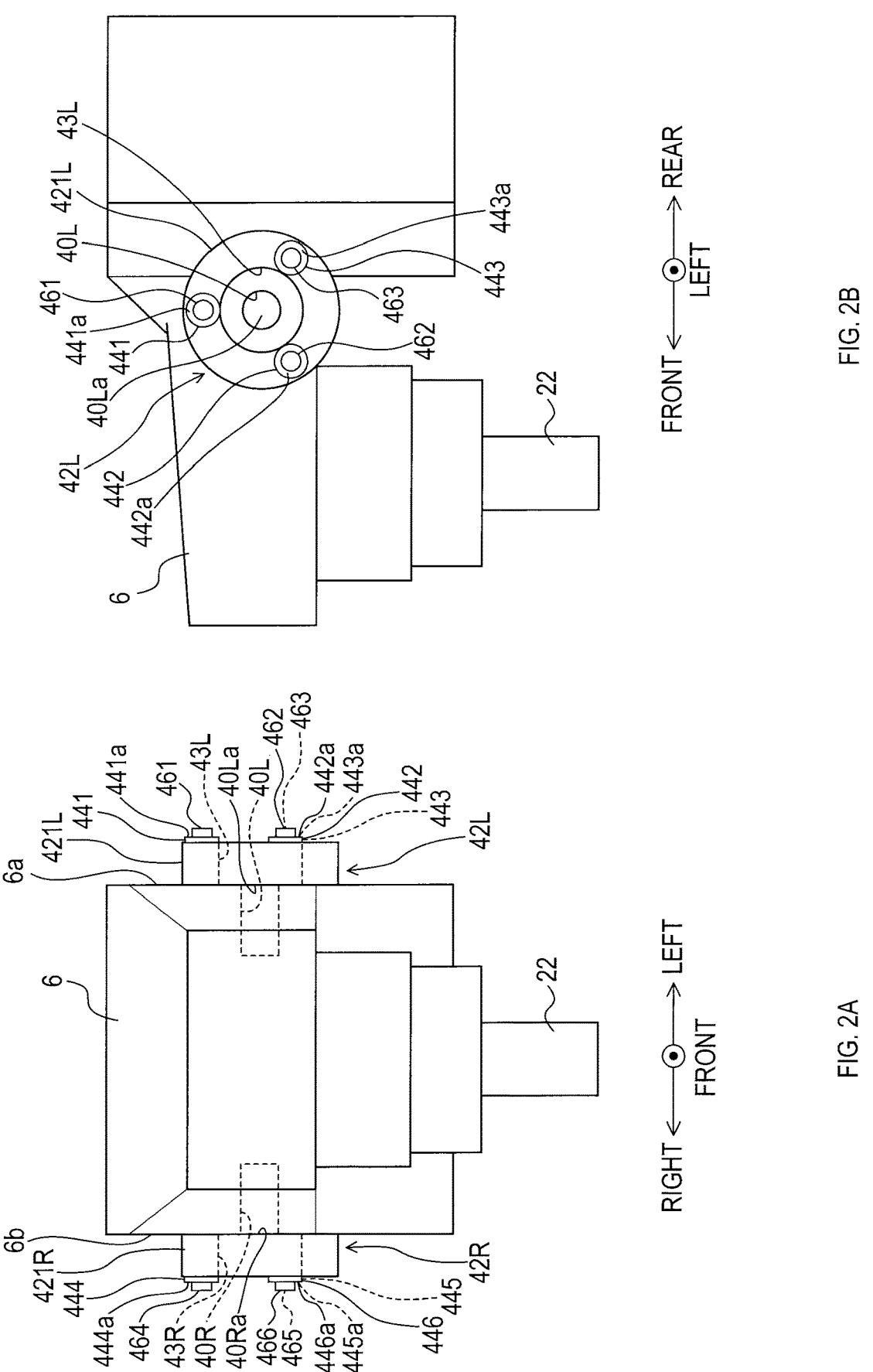
FIG. 2A is a schematic front view of a gear housing that is not mounted on a tool.
FIG. 2B is a schematic side view of the gear housing that is not mounted on the tool (a diagram of the electric work machine, as viewed from a left of the electric work machine)

As shown in FIG. 2A and FIG. 2B, a distal end of the output shaft 22 protrudes from the gear housing 6. A tool 20 (see FIG. 1) is detachably attached to the distal end of the output shaft 22. The output shaft 22 receives the rotational force of the motor 30 via the drive mechanism 7. The output shaft 22 transmits the received rotational force to the tool 20, thereby to rotate the tool 20. Specifically, the output shaft 20 rotates integrally with the tool 20. As shown in FIG. 1, the tool 20 may be, for example, disc-shaped. The tool 20 attachable to the output shaft 22 includes, for example, a cutting blade (or an abrasive cut-off wheel). The tool 20 is capable of grinding, cutting, or polishing a work target (or work piece). The tool 20 may be in a form of, for example, a grinding wheel, a cutting wheel, or a wire brush. A portion or all of the drive mechanism 7 may be omitted. For example, the drive mechanism 7 does not have to include a gear. That is, the rotational force of the motor 30 may be transmitted to the output shaft 22 not via a gear. The motor 30 may be arranged such that the rotation axis of the motor 30 is parallel to the output shaft 22. In this case, the rotor of the motor 30 may be directly coupled to the output shaft 22.

A wheel cover 24 is attached to the gear housing 6. During operation by the electric work machine 1, broken pieces of the work target and/or the tool 20 may scatter in a surrounding area of the electric work machine 1. The wheel cover 24 protects the user from such broken pieces. The wheel cover 24 has a substantially semi-circular shape. The wheel cover 24 covers, from the gear housing 6, a portion (a substantially half, in the present embodiment) of the tool 20 fixed to the output shaft 22.

The wheel cover 24 is detachably attached to a cover attachment portion provided on a distal end portion of the gear housing 6. The distal end portion of the gear housing 6 protrudes from the output shaft 22. The cover attachment portion has a cylindrical shape, and surrounds the output shaft 22. A central axis of the cover attachment portion coincides with the central axis of the output shaft 22.

As shown in FIG. 2A, the gear housing 6 includes a first side surface 6a and a second side surface 6b. The first side surface 6a corresponds to a left face of the gear housing 6, and the second side surface 6b corresponds to a right face of the gear housing 6.

As shown in FIG. 2A and FIG. 2B, a first attachment portion 42L is provided on the first side surface 6a. A second attachment portion 42R is provided on the second side surface 6b. The handle 50 is detachably attached to the first attachment portion 42L or the second attachment portion 42R. That is, the handle 50 in the present embodiment is attached to a side surface of the main body 2. Thus, hereinafter, the handle 50 is referred as a "side handle 50".

The first attachment portion 42L includes a first receiver 421L. The first receiver 421L has a tubular (for example, cylindrical) shape. That is, the first receiver 421L includes a first through hole 43L.

The second attachment portion 42R includes a second receiver 421R. The second receiver 421R has a tubular (for example, cylindrical) shape. That is, the second receiver 421R includes a second through hole 43R.

The first and second receivers 421L, 421R each include a first end surface and a second end surface. In the present embodiment, each of the first end surface faces the gear housing 6, and abuts a corresponding side surface of the gear housing 6. The second end surfaces correspond to the respective faces opposite to the first end surfaces. Each of the second end surfaces has a planar shape. A distance between the first end surface and the second end surface is constant in the present embodiment. In other words, in the present embodiment, a distance between the first side surface 6a and the second end surface of the first receiver 421L is constant, and a distance between the second side surface 6b of and the second end surface of the second receiver 421R is also constant. Each of the second end surfaces of the first and second receivers 421L, 421R is parallel to the rotation axis of the motor 30.

The first attachment portion 42L further includes a first attachment hole 40L. The first attachment hole 40L includes a first opening 40La. In the present embodiment, the first attachment hole 40L is formed on the first side surface 6a of the gear housing 6. As described below, the side handle 50 includes a shaft 60 (see FIG. 3A). The shaft 60 is screwed in the first attachment hole 40L. A central axis of the first attachment hole 40L coincides with a central axis of the first through hole 43L.

The second attachment portion 42R further includes a second attachment hole 40R. The second attachment hole 40R includes a second opening 40Ra. In the present embodiment, the second attachment hole 40R is formed on the second side surface 6b of the gear housing 6. The shaft 60 is screwed in the second attachment hole 40R. The central axis of the second attachment hole 40R coincides with a central axis of second through hole 43R. The shaft 60 is selectively screwed in the first attachment hole 40L or the second attachment hole 40R.

Figure 3A:
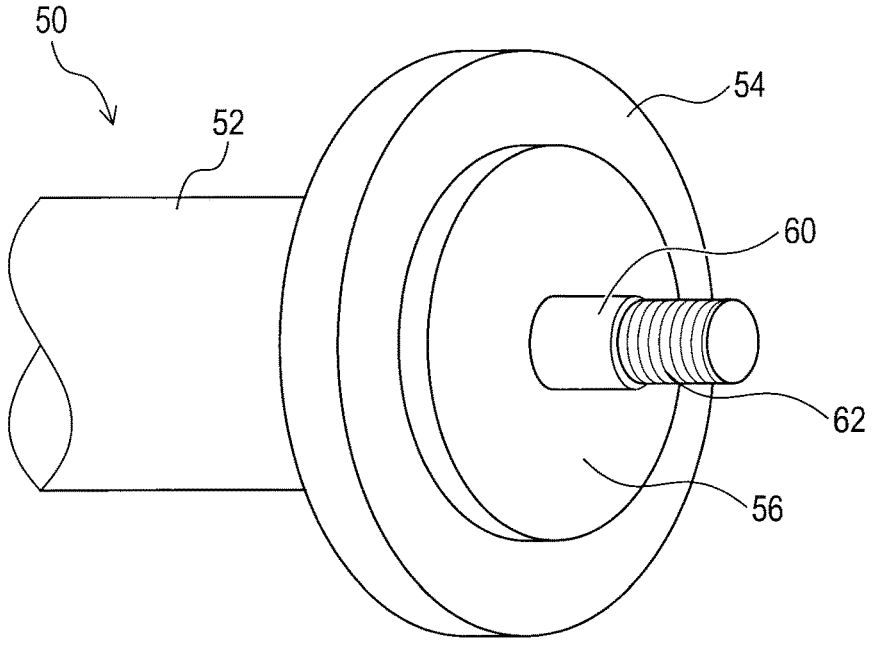
FIG. 3A is a perspective view of a handle.
Figure 3B:
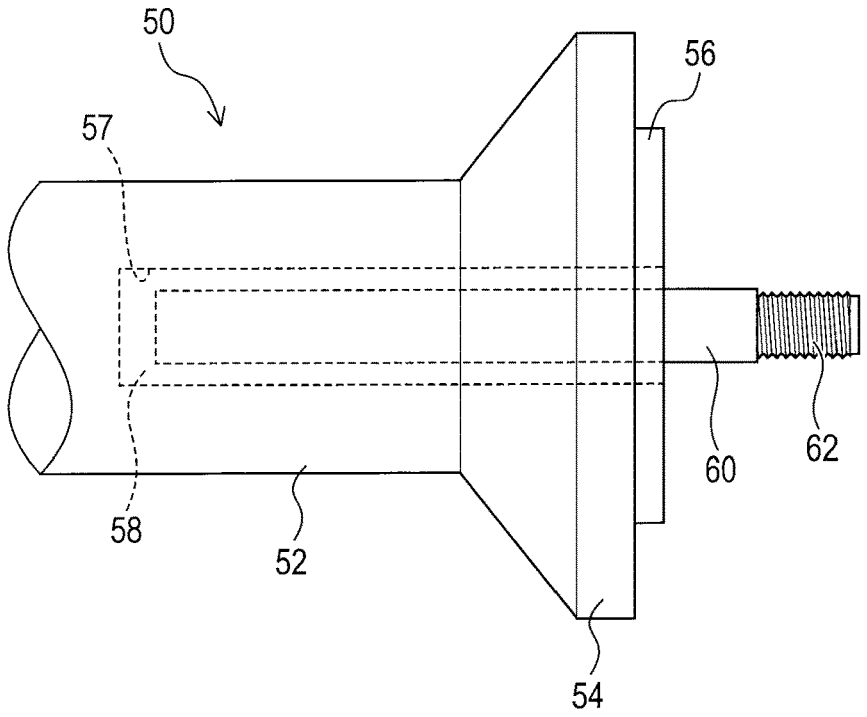
FIG. 3B is a side view of the handle (with a transparent diagram of a shaft disposed within a holding portion)

As shown in FIG. 3A and FIG. 3B, the side handle 50 includes the shaft 60 and a holding portion 52. The shaft 60 corresponds to an axial center of the side handle 50. At a first edge part of the shaft 60, a screw part 62 is formed. The screw part 62 is in a form of, for example, a male screw. The holding portion 52 is gripped by the user.

In FIG. 3B, an inside of the holding portion 52 is transparently illustrated. As shown in FIG. 3B, the holding portion 52 includes an insertion hole 57. The second end of the shaft 60 is inserted in the insertion hole 57, so that the shaft 60 is fixed to the holding portion 52. On an inner surface of the insertion hole 57, a vibration proof rubber 58 is arranged. The vibration proof rubber 58 has a first stiffness (or a first spring constant). In the insertion hole 57, the shaft 60 abuts the vibration proof rubber 58. That is, the shaft 60 is fixed to the holding portion 52 via the vibration proof rubber 58. Of the shaft 60, a first edge part side including the screw part 62 protrudes from the holding portion 52.

Each of the first and second attachment holes 40L, 40R includes a screw thread formed on its inner circumferential surface. Accordingly, the first and second attachment holes 40L, 40R each works as a female screw. That is, the first and second attachment holes 40L, 40R may be screwed on the screw part 62 of the side handle 50. For example, the screw part 62 of the side handle 50 is screwed on the first attachment hole 40L, and thus the side handle 50 is fixed to the first attachment portion 42L (and hence, fixed to the gear housing 6). Also, for example, the screw part 62 of the side handle 50 is screwed on the second attachment hole 40R, and thus the side handle 50 is fixed to the second attachment portion 42R (i.e., the gear housing 6). In other words, the user can selectively attach the side handle 50 to the first attachment portion 42L or the second attachment portion 42R. For example, if the side handle 50 is attached to the first attachment portion 42L, the user can operate the electric work machine 1 while gripping the rear housing 8 in, for example, his/her right hand and also gripping the side handle 50 in his/her left hand. For example, if the side handle 50 is attached to the second attachment portion 42R, the user can operate the electric work machine 1 while gripping the rear housing 8, for example, in the left hand and also gripping the side handle 50 in the right hand.

The side handle 50 further includes a collar portion (or a flange) 54. The collar portion 54 is provided to the first edge of the holding portion 52. The first edge part of the shaft 60 protrudes from the first edge of the holding portion 52. The first end face of the collar portion 54 includes an abutment portion 56. The abutment portion 56 has an annular shape. The shaft 60 passes through the abutment portion 56. In the present embodiment, a central axis of the abutment portion 56 coincides with the central axis of the shaft 60.

A first end surface of the abutment portion 56 is perpendicular to the central axis of the shaft 60. When the side handle 50 is fixed to the gear housing 6, the first end surface of the abutment portion 56 faces and abuts the first attachment portion 42L or the second attachment portion 42R. The first end surface of the abutment portion 56 corresponds to one example of the second surface described in the Overview of Embodiments. The second end surface of the abutment portion 56 faces and abuts the first end face of the collar portion 54.

Figure 4A:
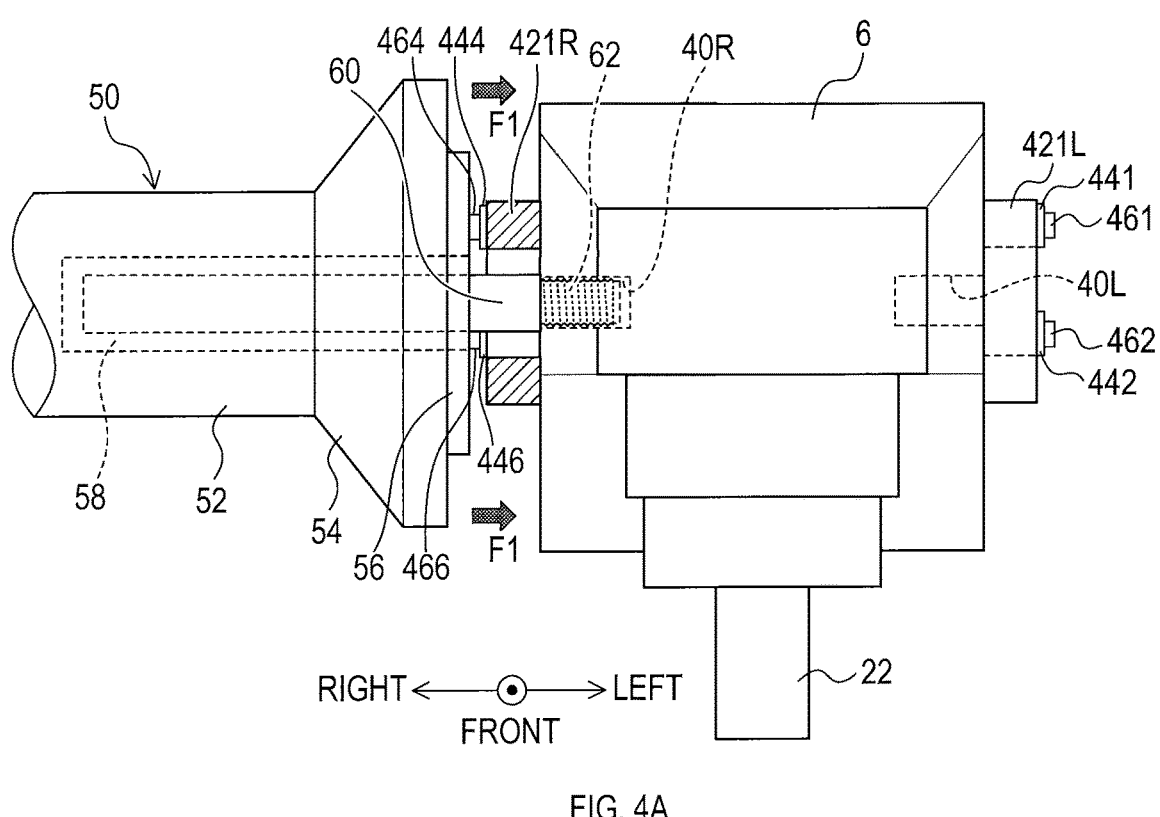
FIG. 4A is an explanatory diagram of the handle that is attached to the gear housing and is not gripped.

As shown in FIG. 4A, if the side handle 50 is attached to the second attachment portion 42R, the first end surface of the abutment portion 56 and the second end surface of the second receiver 421R are arranged in parallel.

Further, as shown in FIG. 2A, FIG. 2B, FIG. 4A, and FIG. 4B, two or more measurement devices (or load detection devices) are provided on the first attachment portion 42L. The two or more measurement devices in the present embodiment include a first measurement device 441, a second measurement device 442, and a third measurement device 443. The first through third measurement devices 441 through 443 are provided on the second end surface of the first receiver 421L. If the side handle 50 is attached to the first attachment portion 42L, the first through third measurement devices 441 through 443 respectively receive first through third loads from the abutment portion 56 of the side handle 50. The first measurement device 441 measures (or detects) the first load, the second measurement device 442 measures the second load, and the third measurement device 443 measures the third load.

In the present embodiment, each of the first through third measurement devices 441 through 443 is in a form of a resistive pressure sensor. The resistive pressure sensor includes a resistor. The resistor has a variable resistance value. That is, the resistance value of the resistor varies depending on loads applied by the resistive pressure sensor. The first through third measurement devices 441 through 443 are provided on the second end surface of the first receiver 421L. Specifically, the first through third measurement devices 441 through 443 are arranged along the first through hole 43L (or along the first opening 40La). More specifically, the first through third measurement devices 441 through 443 are spaced from each other at a certain distance (specifically, by an angle of 120 degrees) along a circumferential direction of the second end surface having an annular shape, of the first receiver 421L. Further, each of the first through third measurement devices 441 through 443 has an equal distance from the central axis of the first attachment hole 40L. In other words, the first through third measurement devices 441 through 443 are arranged on a circumference of a circular whose center is the central axis of the first attachment hole 40L, and also such that the circular is perpendicular to the central axis of the first attachment hole 40L.

The first through third measurement devices 441 through 443 respectively includes first through third rubbers 461 through 463. Specifically, the first measurement device 441 includes a first pressure-receiving surface 441a. If the side handle 50 is attached to the first attachment portion 42L, the first pressure-receiving surface 441a faces the abutment portion 56 of the side handle 50, and receives the first load from the abutment portion 56. The first rubber 461 is provided on the first pressure-receiving surface 441a. Accordingly, the first measurement device 441 receives the first load via the first rubber 461. The second measurement device 442 includes a second pressure-receiving surface 442a. If the side handle 50 is attached to the first attachment portion 42L, the second pressure-receiving surface 442a faces the abutment portion 56 of the side handle 50, and receives the second load from the abutment portion 56. The second rubber 462 is provided on the second pressure-receiving surface 442a. Accordingly, the second measurement device 442 receives the second load via the second rubber 462. The third measurement device 443 includes a third pressure-receiving surface 443a. If the side handle 50 is attached to the first attachment portion 42L, the third pressure-receiving surface 443a faces the abutment portion 56 of the side handle 50, and receives the third load from the abutment portion 56. The third rubber 463 is provided on the third pressure-receiving surface 443a. Accordingly, the third measurement device 443 receives the third load via the third rubber 463.

Figure 4B:
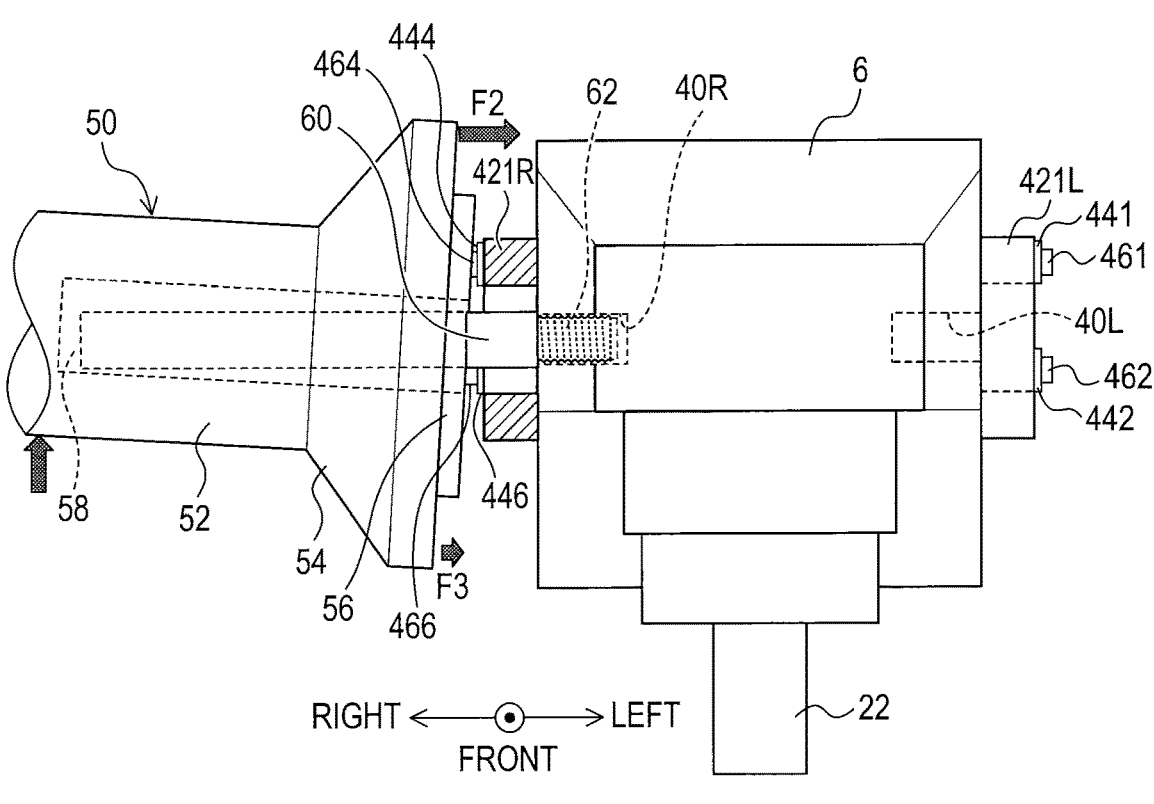
FIG. 4B is an explanatory diagram of the handle that is attached to the gear housing and is gripped.

As shown in FIG. 2A, FIG. 4A, and FIG. 4B, the second attachment portion 42R also includes two or more measurement devices. In the present embodiment, the second attachment portion 42R includes a fourth measurement device 444, a fifth measurement device 445, and a sixth measurement device 446. The fourth through sixth measurement devices 444 through 446 are provided on the second end surface of the second receiver 421R. If the side handle 50 is attached to the second attachment portion 42R, the fourth through sixth measurement devices 444 through 446 respectively receive fourth through sixth loads from the abutment portion 56 of the side handle 50. The fourth measurement device 444 measures (or detects) the fourth load, the fifth measurement device 445 measures the fifth load, and the sixth measurement device 446 measures the sixth load.

In the present embodiment, each of the fourth through sixth measurement devices 444 through 446 is in a form of the resistive pressure sensor. The fourth through sixth measurement devices 444 through 446 are provided on the second end surface of the second receiver 421R. Specifically, the fourth through sixth measurement devices 444 through 446 are arranged along the second through hole 43R (or along the second opining 40Ra). More Specifically, the fourth through sixth measurement devices 444 through 446 are spaced from each other at a certain distance (specifically, by an angle of 120 degrees) along a circumferential direction of the second end surface having an annular shape, of the second receiver 421R. Further, each of the fourth through sixth measurement devices 444 through 446 has an equal distance from the central axis of the second attachment hole 40R. In other words, the fourth through sixth measurement devices 444 through 446 are arranged on a circumference of a circular whose center is the central axis of the second attachment hole 40R, and also such that the circular is perpendicular to the central axis of the second attachment hole 40R.

The fourth through sixth measurement devices 444 through 446 respectively include fourth through sixth rubbers 464 through 466. Specifically, the fourth measurement device 444 includes a fourth pressure-receiving surface 444a. If the side handle 50 is attached to the second attachment portion 42R, the fourth pressure-receiving surface 444a faces the abutment portion 56 of the side handle 50, and receives the fourth load from the abutment portion 56. The fourth rubber 464 is provided on the fourth pressure-receiving surface 444a. Accordingly, the fourth measurement device 444 receives the fourth load via the fourth rubber. The fifth measurement device 445 includes a fifth pressure-receiving surface 445a. If the side handle 50 is attached to the second attachment portion 42R, the fifth pressure-receiving surface 445a faces the abutment portion 56 of the side handle 50, and receives the fifth load from the abutment portion 56. The fifth rubber 465 is provided on the fifth pressure-receiving surface 445a. Accordingly, the fifth measurement device 445 receives the fifth load via the fifth rubber 465. The sixth measurement device 446 includes a sixth pressure-receiving surface 446a. If the side handle 50 is attached to the second attachment portion 42R, the sixth pressure-receiving surface 446a faces the abutment portion 56 of the side handle 50, and receives the sixth load from the abutment portion 56. The sixth rubber 466 is provided on the sixth pressure-receiving surface 446*a*. Accordingly, the sixth measurement device 446 receives the sixth load via the sixth rubber 466.

As shown in FIG. 4A, if the side handle 50 is attached to, for example, the second attachment portion 42R, respective magnitudes of the fourth through sixth loads (for example, an initial value F1) received by the fourth through sixth measurement devices 444 through 446 are substantially equal to each other.

On the other hand, when the side handle 50 attached to the second attachment portion 42R is gripped by the user, the holding portion 52 in the side handle 50 may be tilted with respect to the shaft 60, as shown in FIG. 4B. Such tilting is caused by, for example, a holding force of the user, a self-weight of the electric work machine 1, or the like.

Herein, the first through the sixth rubbers 461 through 466 each have a second stiffness (or a second spring constant). The second stiffness is smaller than the first stiffness of the vibration proof rubber 58. In other words, the vibration proof rubber 58 is more rigid than each of the first through sixth rubbers 461 through 466.

If the side handle 50 is gripped, the holding portion 52 is supported by the vibration proof rubber 58. Accordingly, the first stiffness of the vibration proof rubber 58 is adjusted, and thereby any tilt of the holding portion when the side handle 50 is gripped can be set (or adjusted).

If the holding portion 52 is tilted with respect to the shaft 60 due to the side handle 50 being gripped, the fourth through sixth loads apply to the fourth through sixth measurement devices 444 through 446 from the abutment portion 56 of the side handle 50 are unbalanced.

As a result, any one or two magnitudes of the fourth through sixth loads reaches a value F2 greater than the initial value F1, one or two of the other magnitudes reaches a value F3 smaller than the initial value F1. The fourth through sixth loads are adjustable by adjusting the respective second stiffnesses of the fourth through sixth rubbers 464 through 466.

2-2. Circuit Configuration of Driving Device

Figure 5:
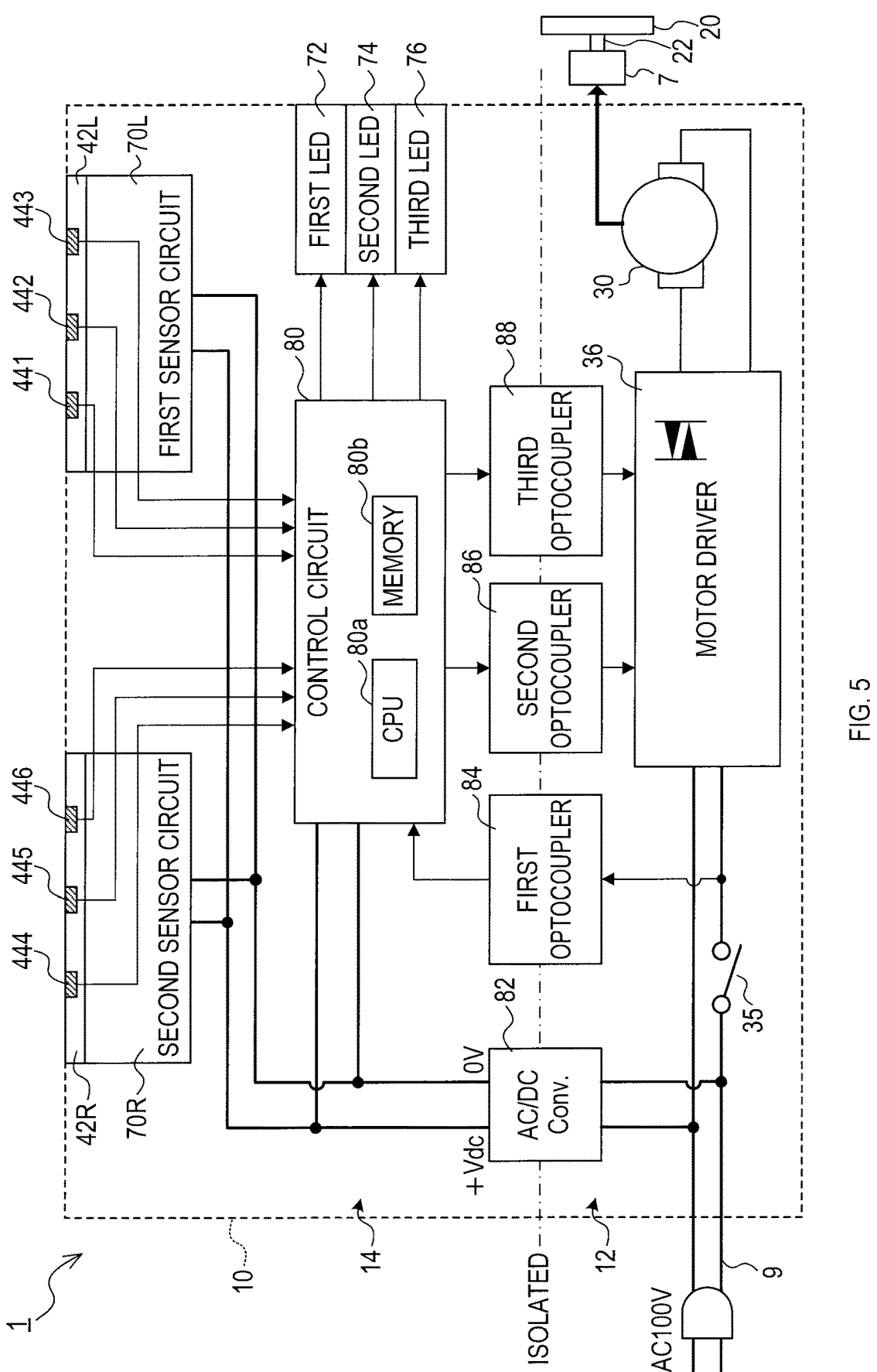
FIG. 5 is a block diagram of a configuration of a driving device.

As shown in FIG. 5, the driving device 10 accommodated in the rear housing 8 includes a driving system 12 and a control system 14. The driving system 12 is configured to receive an AC power from the external AC power source of the electric work machine 1, thereby to drive the motor 30 with the AC power. The control system 14 is configured to control driving of the motor 30.

The driving system 12 includes the motor 30, a motor driver 36, and a trigger switch 35. The trigger switch 35 is switched between an ON-state and an OFF-state in conjunction with the trigger 34. Specifically, when the trigger 34 is not moved (that is, not manually operated), the trigger switch 35 is in the OFF-state. When the trigger 34 is moved, the trigger switch 35 is in the ON-state. When the trigger switch 35 is in the ON-state, the AC power is supplied to the motor driver 36 through a power cord 9 via the trigger switch 35. The motor driver 36 supplies the AC power to the motor 30, thereby to drive the motor 30. The motor driver 36 in the present embodiment includes a bidirectional thyristor. By turning ON or OFF the bidirectional thyristor, the AC power (hereinafter, a "driving power") to be supplied to the motor 30 is controlled (or adjusted).

The control system 14 includes a control circuit 80. The control circuit 80 in the present embodiment is in a form of a microcomputer or a microcontroller unit (MCU), including, for example, a CPU 80*a* and a memory 80*b*. The memory 80*b* may include a semiconductor memory, such as a ROM, a RAM, a NVRAM (non-volatile random-access memory), or a flash memory. That is, the control circuit 80 in the present embodiment includes a microcomputer.

The control circuit 80 executes a program stored in a non-transitory tangible storage medium, to thereby achieve various functions of the control circuit 80. In the present embodiment, the memory 80*b* corresponds to the non-transitory tangible storage medium including programs stored therein. In the present embodiment, the memory 80*b* stores programs related to a connecting/gripping determination process (see FIG. 6) and a motor control process (see FIG. 7), will be described below.

A portion or all of the various functions implemented by the control circuit 80 may be achieved by execution of the program (that is, software processing), or by one or more hardware elements. For example, the control circuit 80 may include a combination of various individual electrical components instead of a microcomputer or in addition to a microcomputer, or may include an Application Specified Integrated Circuit (ASIC), an Application Specific Standard Product (ASSP). The control circuit 80 may include a programmable logic device that can configure any logic circuit. Examples of the programmable logic device include Field Programmable Gate Array (FPGA). Alternatively, the control circuit 80 may be in a form of a hard wired circuit.

The control circuit 80 receives a first detection signal from the first measurement device 441, a second detection signal from the second measurement device 442, a third detection signal from the third measurement device 443, a fourth detection signal from the fourth measurement device 444, a fifth detection signal from the fifth measurement device 445, and a sixth detection signal from the sixth measurement device 446. The first through sixth detection signals respectively indicate the magnitudes of the first through sixth loads received (i.e., measured) by the first through sixth measurement devices 441 through 446.

The control circuit 80 determines, based on the magnitudes of the first through sixth loads indicated by the first through sixth detection signals received, whether the side handle 50 is attached to the first attachment portion 42L or the second attachment portion 42R. If the side handle 50 is attached to the attachment portion 42L or the second attachment portion 42R, the control circuit 80 further determines whether the side handle 50 is gripped by the user. This determination is made based on the magnitudes of the first through sixth loads indicated by the first through sixth detection signals.

In response to whether the side handle 50 is attached to the first attachment portion 42L or the second attachment portion 42R, the control circuit 80 controls (or adjusts) the magnitude of the driving power to the motor 30. Specifically, the control circuit 80 controls the magnitude of the driving power to the motor 30, based on the magnitudes of the measured first through sixth loads.

If the user grips the side handle 50, the control circuit 80 supplies a first magnitude (or a normal magnitude) of a driving power (hereinafter, "normal driving power") from the motor driver 36 to the motor 30, in response to the trigger 34 being moved. The first magnitude of the normal driving power is greater than zero. The first magnitude of the normal driving power may be, for example, a preset constant magnitude Wu. Further, for example, the first magnitude of the normal driving power may vary up to a maximum value WuX, in accordance with a position of the trigger 34.

On the other hand, when the side handle 50 is not attached to the first and second attachment portions 42L, 42R, the control circuit 80 limits a supply of the driving power to the motor 30. That is, the control circuit 80 supplies a second magnitude of the electric power (hereinafter, a "limited driving power") from the motor driver 36 to the motor 30. The second magnitude is smaller than the first magnitude. The second magnitude is greater than zero. The second magnitude may be zero. When the limited driving power is supplied, the rotation speed of the motor 30 is lower than a rotation speed when the normal driving power is supplied.

If (i) the side handle 50 is attached to the first attachment portion 42L or the second attachment portion 42R, and also (ii) the side handle 50 is not gripped by the user, the control circuit 80 limits the supply of the driving power to the motor 30. That is, if the side handle 50 is not gripped by the user, the control circuit 80 supplies a limited magnitude of the electric power from the motor driver 36 to the motor 30. The limited magnitude is smaller than the magnitude of the normal driving power. Specifically, in the present embodiment, the above-described limited driving power is supplied to the motor 30. Accordingly, also in this case, the rotation speed of the motor 30 is decreased. In this case, the magnitude of the limited driving power may be distinct from that when the side handle 50 is not attached.

In other words, in the present embodiment, during the user gripping the side handle 50, the normal driving power is supplied to the motor 30. In order for the user to drive the motor 30 while gripping the side handle 50, the user usually is required to grip the electric work machine 1 with both hands. For example, if the user grips the side handle 50 in the left hand, in order to manually operate the electric work machine 1, the user usually operates the trigger 34 in the right hand while gripping the rear housing 8 in the right hand. Accordingly, it can be basically considered that the electric work machine 1 in the present embodiment is configured to allow the normal driving power to be supplied to the motor 30 only when the user grips the rear housing 8 and the side handle 50 are gripped with both hands. On the other hand, if the side handle 50 is not attached to the main body 2, the supply of the driving power to the motor 30 is limited. If (i) the side handle 50 is attached to the main body 2, and also (ii) the side handle 50 is not gripped by the user, the supply of the driving power to the motor 30 is limited. This inhibits occurrence of a kickback.

The driving device 10 includes an AC/DC converter 82. The AC/DC converter 82 receives the AC power from the power cord 9. The AC/DC converter 82 generates a DC power-supply voltage Vdc from the received AC power. The power-supply voltage Vdc is supplied to each of components (for example, the control circuit 80, first and second sensor circuits 70L, 70R, which are described below) of the control system 14, thereby to operate each component.

The AC/DC converter 82 in the present embodiment is in a form of an isolated converter. That is, the AC/DC converter 82 is electrically connected to the driving system 12 and the control system 14. Specifically, the AC/DC converter 82 is electrically connected to (i) an AC power-supply line in the driving system 12 and (ii) a DC power-supply line in the control system 14.

The AC power-supply line supplies the AC power from the power cord 9 to the motor driver 36. The DC power-supply line supplies the power-supply voltage Vdc to each component of the control system 14. However, the driving system 12 and the control system 14 are electrically isolated from each other within the AC/DC converter 82. That is, the AC power-supply line and the DC power-supply line are electrically isolated from each other. The AC/DC converter 82 may include, for example, a transformer (not shown), and magnetically couple the driving system 12 and the control system 14 via the transformer.

The control system 14 further includes a first sensor circuit 70L and a second sensor circuit 70R. Each of the first and second sensor circuits 70L, 70R receive the power-supply voltage Vdc from the AC/DC converter 82, thereby to operate. The first sensor circuit 70L (i) drives the first through third measurement devices 441 through 443, and (ii) outputs the first through third detection signals. The second sensor circuit 70R (i) drives the fourth through sixth measurement devices 444 through 446, and (ii) outputs the fourth through sixth detection signals.

The driving device 10 further includes a first optocoupler (or a first photocoupler, or a first opto-isolator, or a first optical isolator) 84, a second optocoupler (or a second photocoupler, or a second opto-isolator, or a second optical isolator) 86, and a third optocoupler (or a third photocoupler, or a third opto-isolator, or a third optical isolator) 88.

The first optocoupler 84 is coupled to the AC power-supply line in the driving system 12. Specifically, the first optocoupler 84 is disposed between the trigger switch 35 and the motor driver 36 in the AC power-supply line. The first optocoupler 84 is further coupled to the control circuit 80. However, the driving system 12 and the control system 14 are electrically isolated from each other within the first optocoupler 84. The first optocoupler 84 optically couples, for example, the driving system 12 and the control system 14.

The first optocoupler 84 outputs a trigger operation signal to the control circuit 80. The trigger operation signal indicates a state of the trigger switch 35, that is, whether the trigger switch 35 is in the ON-state or the OFF-state (and thus, whether the trigger 34 is moved). The trigger operation signal indicating the ON-state of the trigger switch 35 directs the control circuit 80 to drive the motor 30. The trigger operation signal indicating the ON-state of the trigger switch 35 corresponds to one example of the drive command in the Overview of Embodiments.

The second optocoupler 86 is coupled to the control circuit 80 and the motor driver 36. However, the driving system 12 and the control system 14 are electrically isolated from each other within the second optocoupler 86. In other words, the control circuit 80 and the motor driver 36 are electrically isolated from each other within the second optocoupler 86. The second optocoupler 86 optically couples, for example, the driving system 12 and the control system 14.

If the second optocoupler 86 receives a permission signal from the control circuit 80, the permission signal is transmitted to the motor driver 36. The permission signal permits the motor driver 36 to drive the motor 30.

The third optocoupler 88 is coupled to the control circuit 80 and the motor driver 36. However, the driving system 12 and the control system 14 are electrically isolated from each other within the third optocoupler 88. The third optocoupler 88 optically couples, for example, the driving system 12 and the control system 14.

If the third optocoupler 88 receives a command signal from the control circuit 80, the command signal is transmitted to the motor driver 36. The command signal commands (or directs) the motor driver 36 to supply the driving power required for the motor 30. Specifically, the command signal commands the motor driver 36 to supply the normal driving power or the limited driving power.

Each of the first through third optocouplers 84, 86, 88 may be couple the driving system 12 to the control system 14 in any manner, other than in an electrically coupling manner.

Each of the first through third optocouplers 84, 86, 88 may, for example, electromagnetically couple the driving system 12 to the control system 14.

As described above, the driving system 12 and the control system 14 are electrically isolated completely (or almost completely) each other. This inhibits the AC power conducted (or transmitted) in the driving system 12 from affecting operation of the control system 14 (for example, a malfunction of the control system 14).

The control system 14 further includes a first LED 72, a second LED 74, and a third LED 76. The first through third LEDs 72, 74, 76 are coupled to the control circuit 80.

The first LED 72 is illuminated when the control circuit 80 determines that the side handle 50 is attached to the gear housing 6. The second LED 74 is illuminated when the control circuit 80 determines that the side handle 50 is gripped. The third LED 76 is illuminated, for example, when the trigger switch 35 is in the ON-state.

2-3. Operation of Control Circuit

Next, the following describes the connecting/gripping determination process and the motor control process, which are executed by the control circuit 80. The connecting/gripping determination process is executed to determine whether the side handle 50 is gripped. The motor control process is executed to drive the motor 30 in accordance with the state of the trigger switch 35. When the control circuit 80 (specifically, CPU 80a) is activated, the connecting/gripping determination process and the motor control process are executed. The connecting/gripping determination process and the motor control process are each executed when the programs, stored in the memory 80b and correspond to the processes, are executed. The connecting/gripping determination process is repeatedly executed, for example, periodically. The connecting/gripping determination process and the motor control process include a main routine executed by the control circuit 80 in the present embodiment.

2-3-1. Connecting/Gripping Determination Process

Figure 6:
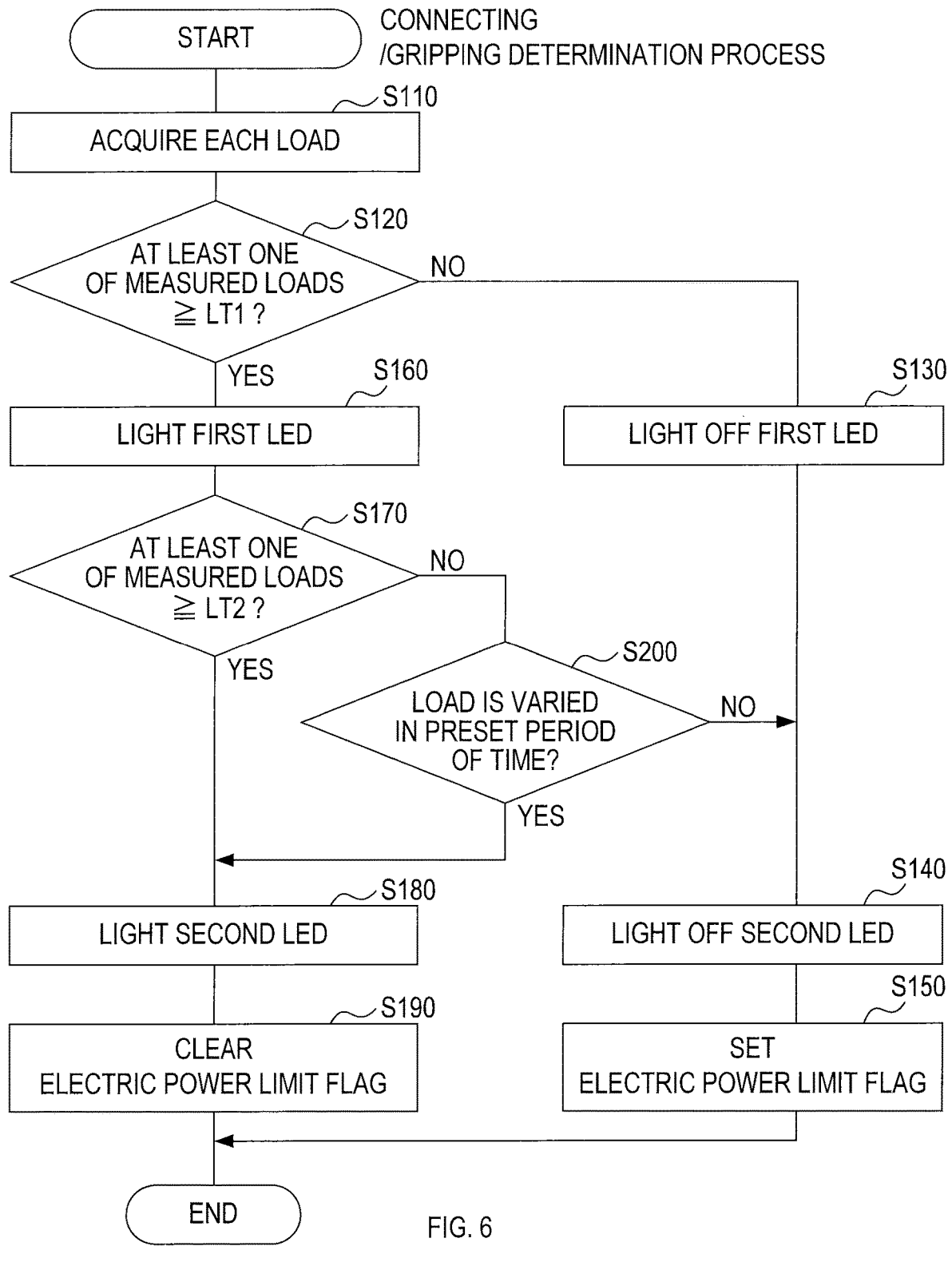
FIG. 6 is a flowchart of a connecting/gripping determination process.

As shown in FIG. 6, the control circuit 80 starts the connecting/gripping determination process, and, in S110, acquires the first through sixth loads. Specifically, the control circuit 80 acquires the first through sixth loads measured by the first through sixth measurement devices 441 through 446. More specifically, the control circuit 80 receives the first through sixth detection signals from the first through sixth measurement devices 441 through 446. The control circuit 80 acquires the first through sixth loads measured (hereinafter, collectively referred to as a "measured loads"), based on the first through sixth detection signals received.

In S120, the control circuit 80 determines whether at least one of the measured loads acquired in S110 is greater than or equal to a first threshold LT1. The first threshold LT1 may be, for example, preset.

In S120, if at least one of the acquired first through third loads is greater than or equal to the first threshold LT1, the control circuit 80 determines that the side handle 50 is attached to the first attachment portion 42L. If at least one of the acquired fourth through sixth loads is greater than or equal to the first threshold LT1, the control circuit 80 determines that the side handle 50 is attached to the second attachment portion 42R.

If all the measured loads acquired are less than the first threshold LT1, the control circuit 80 determines that the side handle 50 is not attached to the gear housing 6.

If determining in S120 that the side handle 50 is not attached, the control circuit 80 proceeds to S130. In S130, the control circuit 80 lets the first LED 72 light off. Subsequently, in S140, the control circuit 80 lets the second LED 74 light off. Subsequently, in S150, the control circuit 80 sets an electric power limit flag. After S150, the control circuit 80 ends the connecting/gripping determination process.

If determining in S120 that the side handle 50 is attached, the control circuit 80 proceeds to S160. In S160, the control circuit 80 lights the first LED 72, thereby to notify the user that the side handle 50 is attached.

In S170, the control circuit 80 determines whether at least one of the measured loads acquired in S110 is greater than or equal to a second threshold LT2. The second threshold LT2 may be, for example, preset.

The second threshold LT2 is used to determine whether the side handle 50 attached to the first attachment portion 42L or the second attachment portion 42R is gripped by the user. The second threshold LT2 is greater than the first threshold LT1.

In S170, if at least one of the acquired first through third loads is greater than or equal to the second threshold LT2, the control circuit 80 determines that the side handle 50 attached to the first attachment portion 42L is gripped by the user. If at least one of the acquired fourth through sixth loads is greater than or equal to the second threshold LT2, the control circuit 80 determines that the side handle 50 attached to the second attachment portion 42R is gripped by the user.

If at least one of the measured loads acquired is greater than or equal to the second threshold LT2, the control circuit 80 lights the second LED 74 in S180, thereby to notify the user that the user grips the side handle 50.

Subsequently, in S190, the control circuit 80 clears the electric power limit flag, on the basis that the side handle 50 is gripped. After S190, the control circuit 80 ends the connecting/gripping determination process.

If determining in S170 that all the measured loads do not reach the second threshold LT2, the control circuit 80 proceeds to S200. In S200, the control circuit 80 determines whether at least one of the measured loads acquired has varied in a preset period of time (or is varying). For example, every time the connecting/gripping determination process is executed periodically, the acquired first through sixth loads may be stored. Further, by referring to the most recent two or more values stored in the preset period of time, a determination may be made whether each of the first through sixth loads varies or is kept. Alternatively, in S200, for example, wait for the preset period of time, and a determination is made whether on each of the first through sixth loads varies during that preset period of time.

In S200, at least one of the measured loads acquired varies in the preset period of time, the control circuit 80 determines that the user grips the side handle 50. In this case, the control circuit 80 proceeds to S180.

In S200, if a determination that all the measured loads acquired do not vary in the preset period of time, the control circuit 80 determines that the user does not grip the side handle 50. In this case, the control circuit 80 proceeds to S140.

As described above, in the connecting/gripping determination process, if (i) the side handle 50 is attached to the first attachment portion 42L or the second attachment portion 42R, and also (ii) the side handle 50 is gripped by the user, the electric power limit flag is cleared.

On the other hand, when the side handle 50 is not attached to the first and second attachment portions 42L, 42R, the electric power limit flag is set. Further, when the side handle

50 is attached to the attachment portion 42L or the second attachment portion 42R and the side handle 50 is not gripped by the user, the electric power limit flag is set.

2-3-2. Motor Control Process

Figure 7:
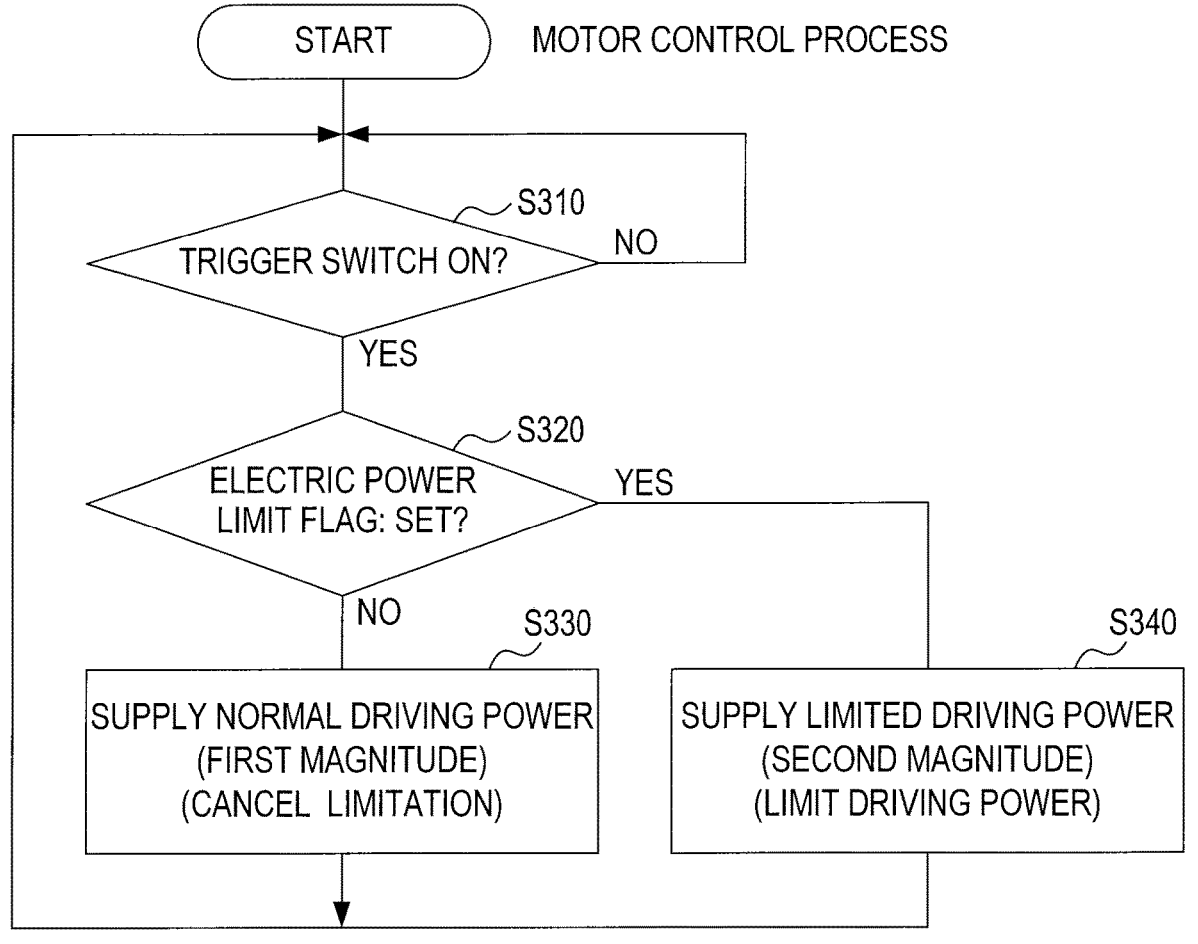
FIG. 7 is a flowchart of a motor control process.

As shown in FIG. 7, the control circuit 80 starts the motor control process, and, in S310, determines whether the trigger switch 35 is in the ON-state. If the trigger switch 35 is not in the ON-state, the control circuit 80 repeats the process of S310.

In S310, if the trigger switch 35 is in the ON-state, the process proceeds to S320. In S320, the control circuit 80 determines whether the electric power limit flag is set.

In S320, if the electric power limit flag is set, the process proceeds to S340. In S340, the control circuit 80 limits the supply of the driving power to the motor 30. That is, the motor driver 36 is controlled so as to supply the limited driving power to the motor 30. Specifically, the control circuit 80 outputs, to the motor driver 36, the command signal commanding a limitation of the driving power via the third optocoupler 88. Accordingly, the driving power (limited driving power) from the motor driver 36, which is a decreased (limited) driving power at a normal time (i.e., the normal driving power), is supplied to the motor 30, so that the motor 30 is driven. After S340, the process proceeds to S310.

In S320, if the electric power limit flag is not set, the process proceeds to S330. In S330, the control circuit 80 does not limit the supply of the driving power to the motor 30. That is, the motor driver 36 is controlled so as to supply the normal driving power to the motor 30. If the process proceeds to S330 in the state where the limited driving power is supplied, the control circuit 80 switches a supply power to the normal driving power. The control circuit 80 outputs to the motor driver 36, via the third optocoupler 88, the command signal commanding, specifically, that the driving power is not limited (or the limitation is canceled). This causes the normal driving power to be supplied from the motor driver 36 to the motor 30, thereby to drive the motor 30. After S330, the process proceeds to S310.

2-4. Effect of Embodiments

In the electric work machine 1 in the present embodiment, the side handle 50 is selectively attachable to the first attachment portion 42L or the second attachment portion 42R. The first through third measurement devices 441 through 443 are provided on the first attachment portion 42L. The fourth through sixth measurement devices 444 through 446 are provided on the second attachment portion 42R. The first through sixth measurement devices 441 through 446 measure (or detect) the first through sixth loads, respectively.

The control circuit 80 determines, based on the measured first through sixth loads, whether the side handle 50 is attached to the first attachment portion 42L or the second attachment portion 42R. If the side handle 50 is attached to the first attachment portion 42L or the second attachment portion 42R, the control circuit 80 further determines whether the user grips the side handle 50. In the present embodiment, the control circuit 80 holds such determination results by using the electric power limit flag.

When the trigger switch 35 is turned on (that is, the trigger 34 is moved), the control circuit 80 determines whether the electric power limit flag is set. This determination indirectly corresponds to the determination whether the side handle 50 is gripped. If the electric power limit flag is not set (that is, the side handle 50 is gripped), the control circuit 80 drives the motor 30 at the normal driving power. On the other hand, if the electric power limit flag is set (that is, the side handle 50 is not gripped), the control circuit 80 drives the motor 30 at the limited driving power. In other words, the driving power to the motor 30 is decreased, compared with that at the normal times.

Accordingly, the electric work machine 1 in the present embodiment enables the control circuit 80 to determine whether the side handle 50 is gripped, without providing a detection unit (for example, a sensor) on the side handle 50. Accordingly, the electric work machine 1 in the present embodiment readily achieves a simpler device configuration, compared with one described in Patent Document 1.

2-5. Correspondence Between Terms

Each of the first and second attachment holes 40L, 40R corresponds to one example of the first hole in the Overview of Embodiments. The vibration proof rubber 58 corresponds to one example of a second elastic body in the Overview of Embodiments. Each of the first through the sixth rubbers 461 through 466 corresponds to one example of a first elastic body in the Overview of Embodiments. Each of the first through the sixth pressure-receiving surface 441a through 446a corresponds to one example of a first surface in the Overview of Embodiments. The driving system 12 corresponds to one example of a first electric system in the Overview of Embodiments. The control system 14 corresponds to one example of a second electric system in the Overview of Embodiments.

3. Other Embodiments

Although the embodiments of the present disclosure have been explained above, the present disclosure may be implemented in various forms without being limited to the aforementioned embodiments.

3-1. For example, in the aforementioned embodiments, based on the measured first through sixth loads, the determinations are made on whether the side handle 50 is attached to the gear housing 6, and whether the side handle 50 is gripped by the user. In response to results of the determinations, the driving power is controlled to the normal driving power or the limited driving power.

However, in the electric work machine 1, the driving of the motor 30 may be started with the tool 20 being pressed against the work target. In this case, the tool 20 may receive a reaction force from the work target, and thereby kickback may occur.

In order to achieve a reduction in such kickback, the control circuit 80 may include a pressing-determination function. The pressing-determination function includes determining, based on the acquired first through sixth loads, whether the tool 20 is pressed against the work target.

Figure 8:
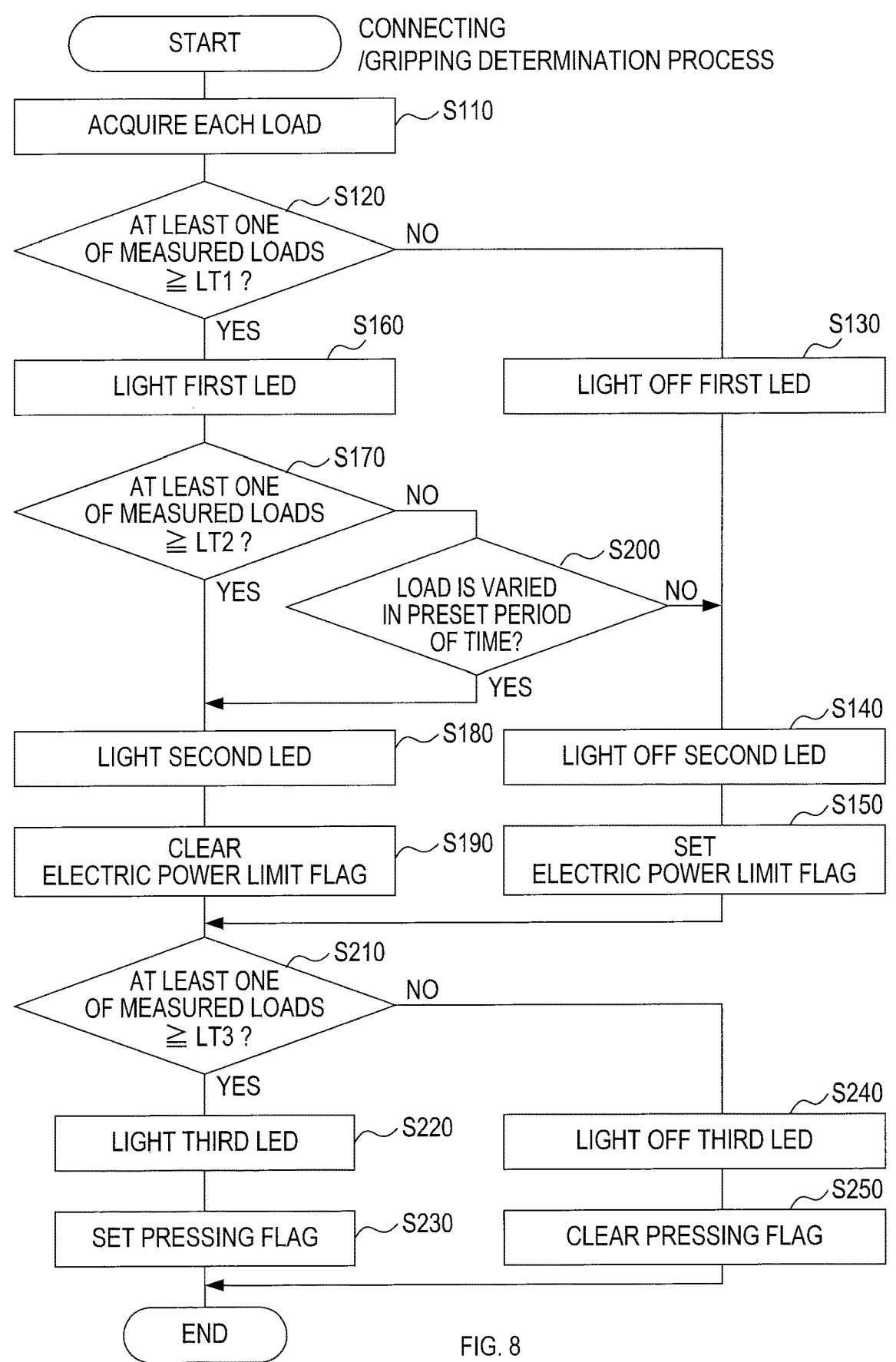
FIG. 8 is a flowchart of a modification example of a connecting/gripping determination process.

The connecting/gripping determination process and the motor control process that include the pressing-determination function is described by reference to FIG. 8 and FIG. 9. The connecting/gripping determination process shown in FIG. 8 corresponds to one of modifications of the connecting/gripping determination process shown in FIG. 6. In FIG. 8, steps of the process identical to those in FIG. 6 are denoted by the reference numerals used in FIG. 6. The motor control process shown in FIG. 9 corresponds to one of modifications of the motor control process shown in FIG. 7.

Figure 9:
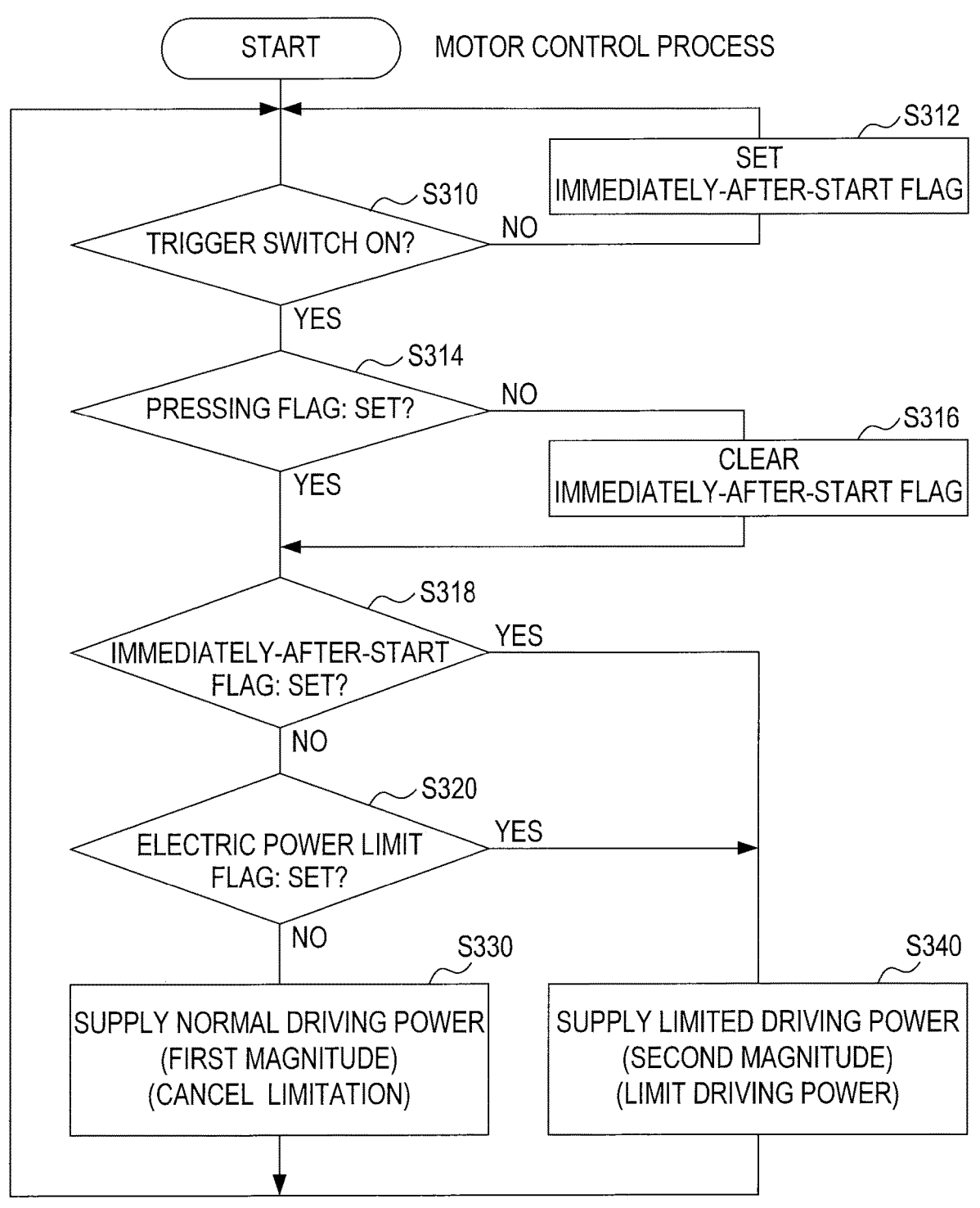
FIG. 9 is a flowchart of a modification example of a motor control process.

In FIG. 9, steps of the process identical to those in FIG. 7 are denoted by the reference numerals used in FIG. 7.

In the connecting/gripping determination process shown in FIG. 8, after S150 or S190, the process proceeds to S210. In S210, the control circuit 80 determines whether at least one of the measured loads acquired in S110 is greater than or equal to a third threshold LT3. The third threshold LT3 may be, for example, preset.

The third threshold LT3 is used to detect that the tool 20 is pressed against the work target. Thus, the third threshold LT3 is greater than the second threshold LT2.

In S210, if at least one of the measured loads acquired is greater than or equal to the third threshold LT3, the control circuit 80 determines that the tool 20 is pressed against the work target. In this case, the control circuit 80 lights the third LED 76 in S220. Accordingly, it is notified that the tool 20 is pressed against the work target. Subsequently, in S230, the control circuit 80 sets a pressing flag. After S230, the control circuit 80 ends the connecting/gripping determination process.

In S210, if all the measured loads acquired do not reach the third threshold LT3, the control circuit 80 lets the third LED 76 light off in S240. Subsequently, in S250, the control circuit 80 clears the pressing flag. After S250, the control circuit 80 ends the connecting/gripping determination process.

Next, the motor control process shown in FIG. 9, if the trigger switch 35 is not in the ON-state in S310, the control circuit 80 sets an immediately-after-start flag in S312. At this time, the motor 30 is still not driven. After S312, the process proceeds to S310.

If the trigger switch 35 is in the ON-state in S310, the control circuit 80 determines in S314 whether the pressing flag is set. If the pressing flag is set, the process proceeds to S318.

If the pressing flag is not set in S314, the process proceeds to S316. If the pressing flag is not set in S314, this indicates that the trigger 34 is moved with the tool 20 not being pressed against the work target. Accordingly, in this case, the control circuit 80 clears the immediately-after-start flag in S316, then the process proceeds to S318.

The control circuit 80 determines in S318 whether the immediately-after-start flag is set. If the immediately-after-start flag is set, the process proceeds to S340. If setting of the immediately-after-start flag is made in S318, this indicates that the trigger 34 is moved with the tool 20 being pressed against the work target. In other words, this indicates that the driving of the motor 30 is started with the tool 20 being pressed against the work target. Accordingly, in this case, the control circuit 80 supplies the limited driving power to the motor in S340, similar to S150.

If the immediately-after-start flag is not set in S318, the process proceeds to S320. Steps following S320 are identical to those described in FIG. 7.

In the motor control process of FIG. 9, if (i) the tool 20 is not pressed against the work target at a time of starting the driving of the motor 30, or (ii) pressing of the tool 20 is released after the driving of the motor 30 is started, S320 is executed.

After S320 is executed, like the aforementioned embodiments, the motor 30 is driven, depending on whether the electric power limit flag is set.

Hence, the electric work machine 1 configured to execute the process steps described in FIG. 8 and FIG. 9 provides further effects described below, in addition to effects of the aforementioned embodiments. That is, the electric work machine 1 enables a reduction in a kickback that may result from that the driving of the motor 30 is started with the tool 20 being pressed against the work target.

If the driving of the motor 30 is started with the tool 20 being pressed against the work target, the motor 30 is driven with the limited driving power. If pressing of the tool 20 against the work target is released after the motor 30 is driven, the limitation of the driving power is canceled, and then the normal driving power is supplied to the motor 30.

Accordingly, if the rotation speed of the motor 30 is not increased because of pressing the tool 20 against the work target, the user can relax the pressing of the tool 20 against the work target, thereby to allow the normal driving power to be supplied to the motor 30. As a result, the rotation speed of the motor 30 can be increased.

3-2. The first through sixth measurement devices 441 through 446 in the aforementioned embodiments is in the form of a resistive pressure sensor.

However, the first through sixth measurement devices 441 through 446 are not limited to the form of the resistive pressure sensor. For example, the first through sixth measurement devices 441 through 446 may be in a form of a sensitive rubber or a strain gauge. In other words, the first through sixth measurement devices 441 through 446 may be in any form that can detect a load applied from the side handle 50.

3-3. In the aforementioned embodiments, three measurement devices are provided to each of the first and second attachment portions 42L, 42R. However, each of the first and second attachment portions 42L, 42R may include more than three measurement devices, or two measurement devices. The electric work machine 1 in the aforementioned embodiments detects whether the side handle 50 is gripped, by utilizing a structure that the holding portion 52 is displaced (specifically, tilted as described above) with respect to the shaft 60 when the side handle 50 is gripped by the user. Owing to an application of the detection mechanism described above, two or more measurement devices are provided to each of the first and second attachment portions 42L, 42R in the electric work machine 1 in the aforementioned embodiments. Further, in light of this detection mechanism, the two or more measurement devices are spaced away from each other in the circumferential direction, as described in the aforementioned embodiments, thus enabling an increase in detection accuracy.

Figure 10:
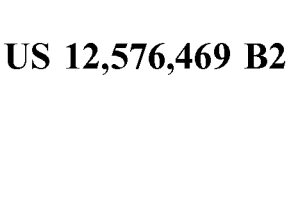
FIG. 10 is a perspective view of an electric work machine in another embodiment.

3-4. One of the first and second attachment portions 42L, 42R may be omitted. Conversely, one or more attachment portions may be provided, in addition to the first and second attachment portions 42L, 42R. The side handle 50 may be attached to a member or a part other than the gear housing 6. For example, the side handle 50 may be attached to the motor housing 4. As shown in FIG. 10, the side handle 50 may be fixed (or secured) to the main body 2. That is, the side handle 50 may be undetachably attached to the main body 2. The first and second attachment portions 42L, 42R may be provided integrally with the main body 2 (for example, the gear housing 9). The first and second attachment portions 42L, 42R may be molded integrally with the main body 2. That is, the first and second attachment portions 42L, 42R may be part of the main body 2. In other words, a portion of the main body 2 may work as the first and second attachment portions 42L, 42R.

3-5. The motor 30 may be in a form distinct from an AC motor. Alternatively, the motor 30 may be in a form of, for example, a brushed DC motor or a brushless DC motor.

3-6. Instead of the AC power, a DC power may be supplied to the electric work machine 1. For example, the electric work machine 1 may be attached to a battery to drive the motor 30 with an electric power from the battery.

3-7. The present disclosure is not limited to a handheld electric grinder, and applicable to electric work machines in any forms, other than the handheld electric grinder. The present disclosure is applicable, for example, any electric work machines, such as a driver drill, which are configured to include a handle attachable to a main body. Further, the present disclosure is applicable to electric work machines including a handle fixed to a main body in an undetachable manner.

3-8. Two or more functions of one element in the afore-mentioned embodiments may be achieved by two or more elements, and one function of one element may be achieved by two or more elements. In addition, two or more functions of two or more elements may be achieved by one element, and one function achieved by two or more elements may be achieved by one element. A part of the configurations in the aforementioned embodiments may be omitted. Furthermore, at least a part of the configurations of the aforementioned embodiments may be added to or replaced with another part of the configurations of the aforementioned embodiments.

3-9. In addition to the above-described electric work machines such as a grinder, the present disclosure may be practiced in various modes such as a system including an electric work machine as a component, a program enabling a computer to function as the control circuit 80, a non-transitory tangible storage medium, such as a semiconductor memory storing the above-described program, and a method of determining connecting/gripping of a handle.

What is claimed is:

1. A handheld electric work machine, comprising:
a motor configured to generate a rotational force;
a motor driver configured to supply an electric power to the motor, thereby to drive the motor;
an output shaft configured to transmit the rotational force of the motor to a tool, thereby to drive the tool;
a housing (i) including a handle fixed thereto or (ii) being configured such that the handle is detachably attached thereto, and the handle being configured to be gripped by a user of the handheld electric work machine;
two or more measurement devices configured to:
receive two or more loads from the handle fixed or attached to the housing; and
measure the two or more loads received; and
a control circuit configured to adjust a magnitude of the electric power, based on the two or more loads measured,
wherein the control circuit is configured to:
adjust the magnitude of the electric power to a first magnitude; and
adjust the magnitude of the electric power to a second magnitude based on the two or more loads measured satisfying a preset requirement, and
wherein the second magnitude is smaller than the first magnitude.

2. The handheld electric work machine according to claim 1,
wherein the handle includes:
a shaft (i) fixed into the housing or (ii) configured to be detachably inserted into the housing; and
a holding portion configured (i) to be gripped by the user, and (ii) to accommodate a portion of the shaft; and
wherein the housing includes a first hole (i) having the shaft inserted therein or (ii) configured to detachably receive the shaft.

3. The handheld electric work machine according to claim 2,
wherein the first hole includes an opening; and
wherein the two or more measurement devices are arranged along a periphery of the opening of the first hole.

4. The handheld electric work machine according to claim 3,
wherein the two or more measurement devices include a first measurement device and a second measurement device, and
wherein a first distance between the first measurement device and a center of the opening is equal to a second distance between the second measurement device and the center of the opening.

5. The handheld electric work machine according to claim 2,
wherein the handle includes a second surface (i) having an annular shape and (ii) including the shaft at a center of the annular shape, and
wherein the second surface is (i) perpendicular to the shaft, and (ii) configured to face the two or more measurement devices while the handle is fixed or attached to the housing.

6. The handheld electric work machine according to claim 1,
wherein each of the two or more measurement devices includes a pressure sensor, the pressure sensor being configured to receive a corresponding one of the two or more loads,
wherein the pressure sensor has a variable resistance value, the variable resistance value varying in accordance with a corresponding one of the two or more loads received.

7. The handheld electric work machine according to claim 1,
wherein each of the two or more measurement devices includes:
a first surface configured to face the handle fixed or attached to the housing; and
a first elastic body on the first surface.

8. The handheld electric work machine according to claim 7,
wherein the first elastic body is configured to be pressed by the handle fixed or attached to the housing; and
wherein the first surface is configured to receive a corresponding one of the two or more loads via the first elastic body.

9. A handheld electric work machine, comprising:
a motor configured to generate a rotational force;
a motor driver configured to supply an electric power to the motor, thereby to drive the motor;
an output shaft configured to transmit the rotational force of the motor to a tool, thereby to drive the tool;
a housing (i) including a handle fixed thereto or (ii) being configured such that the handle is detachably attached thereto, and the handle being configured to be gripped by a user of the handheld electric work machine;
two or more measurement devices configured to:
receive two or more loads from the handle fixed or attached to the housing; and
measure the two or more loads received; and
a control circuit configured to adjust a magnitude of the electric power, based on the two or more loads measured,

wherein the handle includes:

a shaft (i) fixed into the housing or (ii) configured to be detachably inserted into the housing;

a holding portion configured (i) to be gripped by the user, and (ii) to accommodate a portion of the shaft; and a second elastic body between the shaft and the holding portion, and wherein the housing includes a first hole (i) having the shaft inserted therein or (ii) configured to detachably receive the shaft.

10. The handheld electric work machine according to claim 9, wherein each of the two or more measurement devices includes:

a first surface configured to face the handle fixed or attached to the housing, and a first elastic body on the first surface, the first elastic body having a first stiffness, and wherein the second elastic body has a second stiffness, the second stiffness being greater than the first stiffness.

11. A handheld electric work machine, comprising:

a motor configured to generate a rotational force;

a motor driver configured to supply an electric power to the motor, thereby to drive the motor;

an output shaft configured to transmit the rotational force of the motor to a tool, thereby to drive the tool;

a housing (i) including a handle fixed thereto or (ii) being configured such that the handle is detachably attached thereto, and the handle being configured to be gripped by a user of the handheld electric work machine;

two or more measurement devices configured to:

receive two or more loads from the handle fixed or attached to the housing; and measure the two or more loads received; and a control circuit configured to adjust a magnitude of the electric power, based on the two or more loads measured, wherein the control circuit is configured to:

adjust the magnitude of the electric power to a first magnitude; and adjust the magnitude of the electric power to a second magnitude based on none of the two or more loads measured reaching a first threshold, and wherein the second magnitude is smaller than the first magnitude.

12. The handheld electric work machine according to claim 11, wherein the control circuit is configured to adjust the magnitude of the electric power to the second magnitude, based on (i) at least one of the two or more loads measured being greater than or equal to the first threshold, and also (ii) none of the two or more loads measured reaching a second threshold, and wherein the second threshold is greater than the first threshold.

13. The handheld electric work machine according to claim 12, wherein the control circuit is configured to adjust the magnitude of the electric power to the first magnitude, based on at least one of the two or more loads measured being greater than or equal to the second threshold.

14. The handheld electric work machine according to claim 12, wherein the control circuit is configured to adjust the magnitude of the electric power to the first magnitude, based on at least one of the two or more loads measured having varied within a preset period of time.

15. The handheld electric work machine according to claim 14, wherein the control circuit is configured to adjust the magnitude of the electric power to the first magnitude, based on (i) none of the two or more loads measured reaching the second threshold, and also (ii) at least one of the two or more loads measured having varied within the preset period of time.

16. The handheld electric work machine according to claim 12, wherein the control circuit is configured to receive a drive command to thereby drive the motor, the drive command directing the control circuit to drive the motor, wherein the control circuit is configured to adjust the magnitude of the electric power to the second magnitude, based on (i) the motor having stopped, (ii) the control circuit receiving the drive command, and also (iii) a first load of the two or more loads measured being greater than or equal to a third threshold, and wherein the third threshold is greater than the second threshold.

17. The handheld electric work machine according to claim 16, wherein the control circuit is configured to adjust the magnitude of the electric power to the first magnitude, based on the first load having fallen below the third threshold.

18. A handheld electric work machine, further comprising:

a motor configured to generate a rotational force;

a motor driver configured to supply an electric power to the motor, thereby to drive the motor;

an output shaft configured to transmit the rotational force of the motor to a tool, thereby to drive the tool;

a housing (i) including a handle fixed thereto or (ii) being configured such that the handle is detachably attached thereto, and the handle being configured to be gripped by a user of the handheld electric work machine;

two or more measurement devices configured to:

receive two or more loads from the handle fixed or attached to the housing; and measure the two or more loads received;

a control circuit configured to adjust a magnitude of the electric power, based on the two or more loads measured;

a first electric system configured to conduct an AC power, and a second electric system electrically isolated from the first electric system.

19. The handheld electric work machine according to claim 18, (i) wherein the electric power to be supplied to the motor is the AC power and also the first electric system includes the motor and the motor driver, and/or (ii) wherein the second electric system includes the two or more measurement devices and the control circuit.

20. The handheld electric work machine according to claim 18, further comprising a coupler configured to optically or electromagnetically couple the first electric system to the second electric system.

21. The handheld electric work machine according to claim 20, wherein the coupler is configured to optically or electromagnetically transmit a signal from the first electric system to the second electric system, and/or from the second electric system to the first electric system.

22. A handheld electric work machine, comprising:

a motor configured to generate a rotational force;

a motor driver configured to supply an electric power to the motor, thereby to drive the motor;

an output shaft configured to transmit the rotational force of the motor to a tool, thereby to drive the tool;

a housing (i) including a handle fixed thereto or (ii) being configured such that the handle is detachably attached thereto, and the handle being configured to be gripped by a user of the handheld electric work machine;

two or more measurement devices configured to:

receive two or more loads from the handle fixed or attached to the housing; and measure the two or more loads received; and a control circuit configured to adjust a magnitude of the electric power, based on the two or more loads measured, wherein the two or more measurement devices includes first through third measurement devices.

\*    \*    \*    \*    \*